United States Patent
Savy

(10) Patent No.: US 12,425,411 B1
(45) Date of Patent: Sep. 23, 2025

(54) ESTABLISHING AND MANAGING TRUSTED RELATIONSHIPS BETWEEN ENTITIES OF A SOFTWARE-AS-A-SERVICE (SaaS) PLATFORM

(71) Applicant: Blabber, Inc., Bellevue, WA (US)

(72) Inventor: Lyamen Savy, Bellevue, WA (US)

(73) Assignee: Blabber, Inc., Bellevue, WA (US)

( * ) Notice: Subject to any disclaimer, the term of this patent is extended or adjusted under 35 U.S.C. 154(b) by 0 days.

(21) Appl. No.: 18/732,204

(22) Filed: Jun. 3, 2024

(51) Int. Cl.
H04L 9/40 (2022.01)

(52) U.S. Cl.
CPC .................. *H04L 63/102* (2013.01)

(58) Field of Classification Search
CPC ..................................................... H04L 63/102
See application file for complete search history.

(56) References Cited

U.S. PATENT DOCUMENTS

| | | | | |
|---|---|---|---|---|
| 11,295,274 | B1* | 4/2022 | Ghasem Khan Ghajar | ................. G06F 9/547 |
| 11,354,362 | B1* | 6/2022 | Harper | ................. G06F 16/322 |
| 12,294,558 | B2* | 5/2025 | Jansson | ................. H04L 51/56 |
| 2006/0259957 | A1* | 11/2006 | Tam | ................. G06Q 40/03 726/3 |
| 2008/0065425 | A1* | 3/2008 | Giuffre | ................. G06Q 10/0635 705/30 |
| 2012/0109838 | A1* | 5/2012 | Younger | ................. G06Q 10/1053 705/321 |
| 2016/0315903 | A1* | 10/2016 | Singh | ................. H04L 51/52 |
| 2016/0350781 | A1* | 12/2016 | Feduk, Jr. | ................. G06Q 30/0214 |
| 2021/0119785 | A1* | 4/2021 | Ben-Reuven | ................. H04L 9/3239 |
| 2023/0121420 | A1* | 4/2023 | Jain | ................. H04L 63/108 726/4 |
| 2023/0281064 | A1* | 9/2023 | Hsu | ................. G06F 21/6218 709/201 |
| 2024/0236020 | A1* | 7/2024 | Jansson | ................. H04L 51/216 |
| 2025/0131468 | A1* | 4/2025 | Chen | ................. G08B 21/182 |

\* cited by examiner

*Primary Examiner* — Harris C Wang
(74) *Attorney, Agent, or Firm* — Lowenstein Sandler LLP

(57) ABSTRACT

Methods and systems for establishing and managing trusted relationships between entities of a software-as-a-service (SaaS) platform are provided herein. A request associated with a first client account of a SaaS platform is received to establish a trusted relationship between a second and third client account of the platform. A client device associated with the third client account is identified based on information included in the request. A request is transmitted to the client device to establish the trusted relationship. A determination is made of whether response criteria associated with the request are satisfied. Responsive to a determination that the response criteria are satisfied, a data structure is updated to indicate the trusted relationship established between the second and third client account. A communication operation is performed to enable communication between client devices associated with the second and third client accounts, in accordance with the trusted relationship.

20 Claims, 12 Drawing Sheets

ESTABLISHING AND MANAGING TRUSTED RELATIONSHIPS BETWEEN ENTITIES OF A SOFTWARE-AS-A-SERVICE (SaaS) PLATFORM

TECHNICAL FIELD

Embodiments of the present disclosure relate, in general, to establishing and managing trusted relationships between entities of a software-as-a-service (SaaS) platform.

BACKGROUND

In a digital environment, users of online platforms and/or applications frequently encounter the unwelcome intrusion of spam or unsolicited communications. Users may only be willing to engage with entities of which a trusted relationship is established.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a method is disclosed for establishing and managing trusted relationships between entities of a communication services platform. The method includes receiving a first request associated with a first client account of a software as a service (SaaS) platform to establish a trusted relationship between a second client account of the SaaS platform and a third client account of the SaaS platform. The method further includes identifying a client device associated with the third client account based on information included in the first request. The method further includes transmitting a second request to the client device to establish the trusted relationship between the second client account and the third client account. The method further includes determining whether one or more response criteria associated with the second request are satisfied. The method further includes responsive to determining that the one or more response criteria are satisfied, updating one or more entries of a data structure associated with the SaaS platform to indicate that the trusted relationship is established between the second client account and the third client account. The one or more entries are associated with the first client account and at least one of the second client account and the third client account. The method further includes performing a communication operation to enable communication between the client device associated with the third client account and an additional client device associated with the second client account, in accordance with the trusted relationship.

In some implementations, the first client account is associated with a first client device, the additional client device associated with the second client account is a second client device, and the identified client device associated with the third client is a third client device. The method further includes providing a user interface (UI) to the first client device. The UI includes one or more UI elements that enable a first user of the first client device to initiate correspondence between the first client device and the third client device. The first request is received upon detection of user engagement with the one or more UI elements.

In some implementations, each of the one or more UI elements are associated with a respective form of correspondence. The method further includes detecting a first user selection of a first UI element of the one or more UI elements, wherein the first UI element is associated with a first form of correspondence. The method further includes identifying a correspondence template associated with the first form of correspondence of the first UI element. The method further includes updating the UI at the first client device to include content of the identified correspondence template. The method further includes receiving a third request from the first client device to modify at least a portion of the content of the identified correspondence template, wherein the modified content corresponds to information of the first request.

In some implementations, the method further includes upon performing the communication operation to enable the communication between the third client device associated with the third client account and the second client device associated with the second client account, updating the UI at the first client device to indicate that the trusted relationship is established between the second client account and the third client account.

In some implementations, determining whether the one or more response criteria associated with the second request are satisfied includes at least one of determining whether a response to the second request is received during a particular time period following the transmittal of the second request to the identified client device, or determining whether the response indicates that a user associated with the third client account has authorized establishment of the trusted relationship between the second client account and the third client account.

In some implementations, updating the one or more entries of the data structure to indicated that the trusted relationship is established between the second account and the third account includes identifying, of the one or more entries, a first entry associated with the first client account. The method further includes updating the first entry to include a mapping between the first client account and the second client account. The method further includes identifying, of the one or more entries, a second entry associated with at least one of the second client account or the third client account. The method further includes updating the second entry to include the mapping.

In some implementations, the first entry includes a counter indicating a number of trusted relationships established between the second client account and additional client accounts by the first client account. The method further includes incrementing a value of the counter based on the trusted relationship between the second client account and the third client account.

In some implementations, the method further includes determining, based on the communication between the client device associated with the third client account and the additional client device associated with the second client device include, whether one or more relationship criteria pertaining to the trusted relationship between the second client account and the third client account are satisfied. The method further includes responsive to determining that the one or more relationship criteria are satisfied, updating at least a first entry of the one or more entries of the data structure to indicate that the one or more relationship criteria are satisfied. The first entry is associated with the first client account.

In some implementations, the first request is received via a first application programming interface (API) call associated with the first client account.

In some implementations, the method further includes establishing a connection between the first client account and an additional account of another platform that is remote from the SaaS platform. The connection is established based on a third request received from the first client account. The method further includes upon performing the communication operation to enable the communication between the client device associated with the third client account and the additional client device associated with the second client account, identifying a relationship protocol provided to the SaaS platform by the second client account, wherein the relationship protocol indicates data to be transmitted from the first client account to the additional account of the other platform upon performance of the communication operation. The method further includes transmitting the data from the first client account to the additional account in accordance with the identified relationship protocol.

In some implementations, the data is transmitted from the first client account to the additional client account in response to a fourth request received from the first client account.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
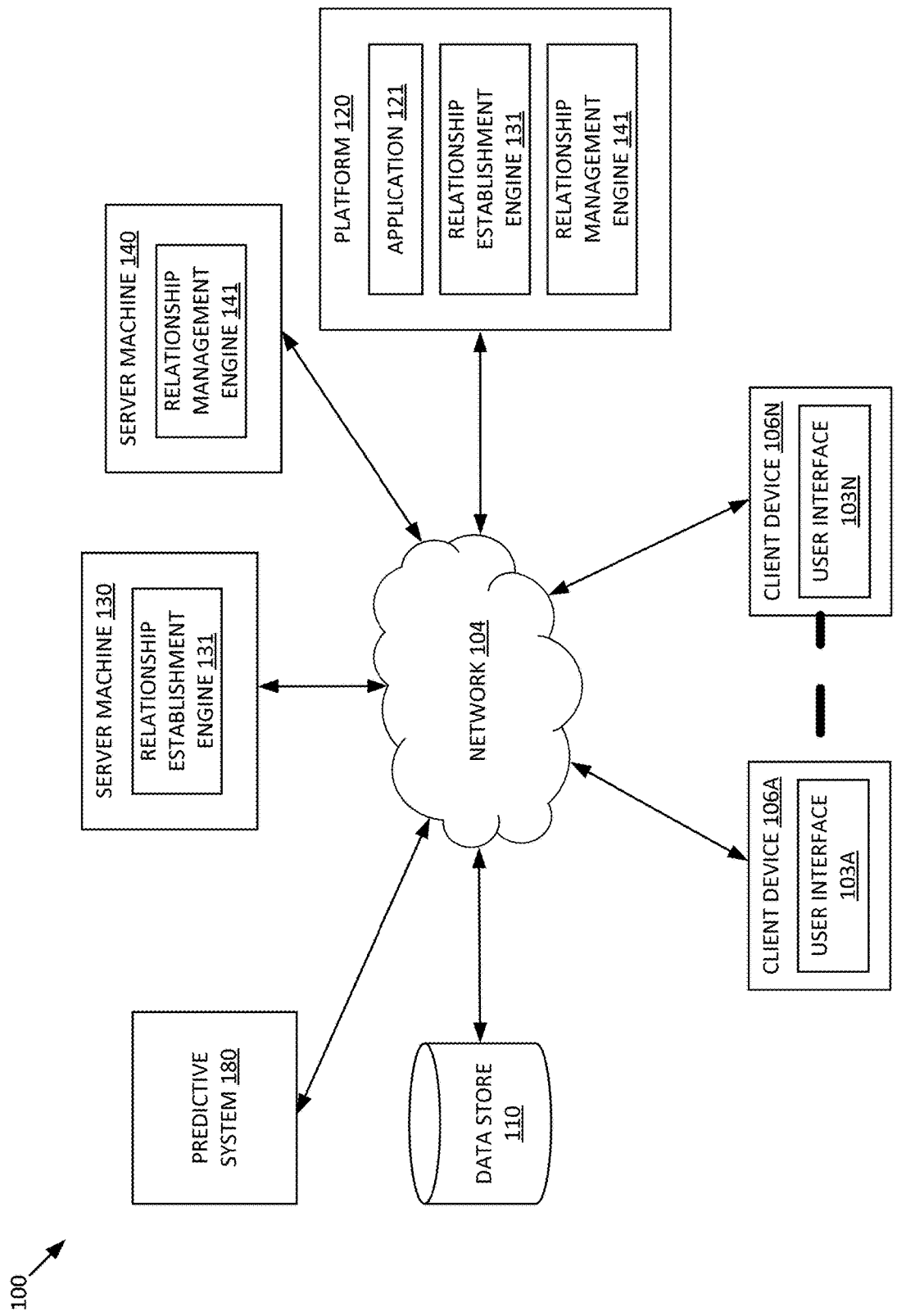
FIG. 1 depicts an illustrative computer system architecture, according to aspects of the present disclosure.

Embodiments disclosed herein include methods and systems for establishing and managing trusted relationships between entities of a software-as-a-service (SaaS) platform. In a digital environment, users of online platforms and/or applications frequently encounter the unwelcome intrusion of spam or unsolicited communications, which range from irrelevant advertisements to potentially harmful phishing attempts. Once a persistent and/or malicious entity obtains a user's contact information, the user may receive unsolicited, and sometimes frequent, communications from the entity until the user takes action to prevent the entity from communicating with the user (e.g., by blocking the entity's phone number, email address, etc.) or the entity gives up attempting to engage with the user (e.g., if the user ignores the entity's communications for a long enough period of time). In light of this, users are frequently unwilling to engage with entities of which they do not know or are unfamiliar with. This can make it difficult for an honorable or trusted source to engage in communications with a user of online platforms and/or applications, even when other users that the user trusts refer the trusted source to the user. Further, the frequent unsolicited communications from persistent and/or malicious entities can consume a significant amount of computing resources (e.g., processing power, network bandwidth, memory space, etc.) of the overall computing system and can expose users receiving such communications to heightened security risks.

Embodiments of the present disclosure are directed to methods and systems for establishing and managing trusted relationships between entities of a software-as-a-service (SaaS) platform. A trusted relationship refers to a secure and reliable connection established between client accounts of two or more users of a computing system, which is based on mutual authentication, authorization, and/or encrypted communication channels to ensure that communications exchanged between the two or more users are authorized and secure. A client account refers to a data object that stores or otherwise includes information (e.g., settings, permissions, etc.) pertaining to a user and/or the user's activity via the platform computing system. As described herein, a trusted relationship between client accounts may be reflected by settings and/or permissions that enable communication or correspondence between client devices associated with respective users of the computing system, in some embodiments.

In some embodiments, a platform (e.g., a communication services platform, a SaaS platform etc.) may facilitate communication between two or more entities of system 100. The platform may receive a request (e.g., from a first client device associated with a first user of the platform) to establish a trusted relationship between client accounts of a second user and a third user of the platform. In an illustrative example, users of the platform can include participants or patrons of a professional conference. The first user may be an attendee of the conference that provides the request (e.g., via a client device) to the platform to establish a trusted relationship between a second user and a third user attending the conference. In another example, the second user of the platform may be an enterprise user (e.g., a car dealership, a realtor, etc.) of which the first user recently engaged (e.g., purchased a car from, purchased a home from, etc.). The first user may provide the request to the platform to establish the trusted relationship between the second user and a third user that may be interested in engaging with the enterprise user.

Upon receiving the request to establish the trusted relationship between the client accounts of the second user and the third user, the platform may identify a client device associated with the client account for the third user (e.g., based on information of the received request) and may transmit another request to the client device to establish the trusted relationship between the client account of the second user and the client account of the third user. The request transmitted to the client device of the third user can include a correspondence from the first user to the third user introducing the second user. In some embodiments, the third user can engage with (e.g., respond to, etc.) the correspondence to provide authorization or acceptance of the request to establish trusted relationship, or to reject the request to establish the trusted relationship. In other or similar embodiments, the third user may not engage with the correspondence (e.g., within a particular time period), which can indicate a rejection of the request to establish the trusted relationship.

Responsive to transmitting the request to the client device of the third user, the platform can determine whether one or more response criteria associated with the request are satisfied to determine whether the third user has authorized or rejected the request to establish the trusted relationship. In some embodiments, the platform can determine that the response criteria are satisfied (e.g., and therefore the third user has authorized the request) upon determining that the third user has provided a response to the correspondence within a particular time period and/or the response has a positive sentiment. In other or similar embodiments, the platform can determine that the response criteria are not satisfied (e.g., and therefore the third user has rejected the request) upon determining that the third user has provided a response to the correspondence that has a negative sentiment and/or the third user has not provided a response within the particular time period. Upon determining that the response criteria are not satisfied, the platform can perform one or more operations that prevent the second user from initiating communication with the third user. For example, a client device of the second user may be blocked from transmitting correspondence to the client device of the third user, thereby preventing the third user from being subjected to unwanted correspondence (e.g., spam).

Upon determining that the response criteria are satisfied, the platform can update the client accounts for the second and third users to include settings or permissions that enable communication between client devices of the second and third users, thereby establishing the trusted relationship between the client accounts. In some embodiments, the platform can perform one or more operations to enable the client device of the second user to transmit correspondence to the client device of the third user. For example, the platform can enable the transmission of correspondence from the client device of the second user to the client device of the third user via a correspondence functionality of an application of the platform.

The platform can maintain a data structure that stores data associated with trusted relationships established by and on behalf of client accounts of the platform. In an illustrative example, each entry of the data structure can be associated with a respective client account of the platform. Upon establishment of the trusted relationship between the client accounts of the second and third client accounts, the platform can update an entry of the data structure associated with the client account of the first user to indicate the establishment of the trusted relationship. In an illustrative example, the platform can update the entry associated with the client account of the first user by updating a value of a counter representing a number of trusted relationships initiated by the first user. The platform can additionally or alternatively update entries associated with the client accounts of the second and third users to indicate the establishment of the trusted relationship. In some embodiments, the first user can access information pertaining to the number of trusted relationships they have initiated using one or more user interfaces (UIs) of an application of the platform.

In some embodiments, a trusted relationship established between two or more client accounts can be associated with one or more relationship phases, each corresponding to one or more respective relationship phase criteria. A user of the platform (e.g., an enterprise user) can provide relationship phase data to the platform (e.g., upon creation of a client account for the user) defining each relationship phase for trusted relationships established on behalf of the user and/or a respective relationship phase criterion for each relationship phase. In an illustrative example, relationship phases of a trusted relationship can include an introduction phase (e.g., a time period during or after an introduction has been initiated by the first user), an engagement phase (e.g., a time period during or after a response from the third user has been received), one or more action phases (e.g., a time period during or after the second user initiates communication with the third user, a time period during or after the second user and/or the third user participate in one or more activities), and so forth. In accordance with embodiments and examples described herein, the platform can determine the phase of a trusted relationship based on the relationship phase criteria (e.g., in view of correspondence between the first user and the third user, the second user and the third user, etc.), and can update entries of the data structure to indicate the determined phase of the trusted relationship.

In some embodiments, the user can additionally or alternatively provide achievement data corresponding to each relationship phase to the platform. The achievement data can indicate one or more achievements or awards (e.g., badges, points, etc.) that are to be granted to a client account of a user that facilitated the establishment of a trusted relationship on behalf of the user. Upon detection that a particular relationship phase of the trusted relationship is achieved, the platform can issue an achievement or award corresponding to the relationship phase to the first user (e.g., by updating an entry of the data structure). In some embodiments, the first user may establish a connection between the client account of the platform and another account for an application that is remote or distinct from the platform (e.g., a social media application, a banking application, etc.). Upon issuance of an achievement or award, the first user can transfer data pertaining to the achievement or award to the other account. In an illustrative example, the first user can be issued a badge upon facilitating an introduction between two or more users of the platform (e.g., in accordance with the established trusted relationship). The first user can transfer data pertaining to the badge to an account for a social media platform (e.g., to be posted at a profile or a feed of the social media platform).

Embodiments of the present disclosure provide techniques for establishing and managing secure corrections between client devices connected to a SaaS platform, based on a trusted relationship established between platform users based on mutual authentication and authorization between client accounts of the users. According to embodiments of the present disclosure, a user of a platform is enabled to provide authorization before receiving correspondence from another user of the platform. Accordingly, the user is not subjected to spam or unsolicited communications from other users of the platform, as those users are unable to communicate with the user unless authorization is granted. As the other users are unable to communicate with the user unless authorization is granted, the user may not be subject to irrelevant correspondence and potentially harmful phishing attempts, which improves the overall security of the platform and the computing system. In addition, if the other users are not authorized to correspond with the user, fewer overall messages are transmitted across the platform and the overall computing system, which reduces the overall amount of computing resources (e.g., processing cycles, network bandwidth, memory space, etc.) consumed in the computing system is reduced, making such resources available to other processes of the system. As more resources are available to other processes of the system, an overall efficiency of the computing system is increased and an overall latency of the of the system is decreased.

In addition, embodiments of the present disclosure offer techniques that enable users (e.g., enterprise users, individual users) to track and manage trusted relationships established between client accounts in the platform. For example, an enterprise user can track the number of trusted relationships established on its behalf and the users of the platform that initiated the establishment of the trusted relationship based on entries of the data structure maintained by the platform. Accordingly the enterprise user does not consume additional computing resources tracking and maintaining such data using multiple computing systems, which makes those computing resources available to other processes at such computing systems. This further improves the overall efficiency and decreases the overall latency of such computing systems, as described above.

Further, embodiments of the present disclosure provide users with an option to opt-in to communications with other users of a platform. Accordingly, the platform, and users of the platform, are able to satisfy "opt-in" communication standards and conditions (e.g., as imposed by applicable regulations and/or laws).

FIG. 1 depicts an illustrative computer system architecture 100, according to aspects of the present disclosure. Computer system architecture 100 (also referred to herein as computer system 100) includes one or more client devices 106, a platform 120, one or more data stores 110, one or more server machines, (e.g., server machine 130, server machine 140, etc.), and/or a predictive system 180. In some embodiments, client device(s) 106, platform 120, data store(s) 110, server machine 130, server machine 140, and/or predictive system 180 can be connected via a network 104. In some embodiments, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104. In some embodiments, data store 110 can include or otherwise correspond to a distributed ledger network, such as distributed ledger network 800 of FIG. 8.

In some embodiments, one or more client devices 106 (e.g., client device 106A, client device 106B, client device 106C, etc.) can be connected to platform 120 (e.g., via network 104). For purposes of example and explanation only, client devices 106 are collectively and individually referred to as client device(s) 106 or client device 106 herein. A client device 106 can include any type of computing device, including but not limited to, personal computers (PCs), laptops, mobile phones, smart phones, tablet computers, netbook computers, network-connected televisions, a wearable device (e.g., smart watch, smart glasses, etc.), a smart appliance (e.g., a video doorbell, etc.), etc. In some examples, a client device can also be referred to as a "user device." A client device 106 can include a content viewer, in some embodiments. A content viewer can be an application that provides a user interface (UI) (e.g., user interface 103) for users to view or otherwise access data or content, such as images, video items, web pages, documents, etc. For example, the content viewer may be a web browser that can access, retrieve, present, and/or navigate content (e.g., web pages such as Hyper Text Markup Language (HTML) pages, digital media items, etc.) served by a web server. The content viewer may render, display, and/or present the content to a user. The content viewer may also include an embedded media player (e.g., a Flash® player or an HTML5 player) that is embedded in a web page. In another example, the content viewer may be a standalone application (e.g., a mobile application or app, such as application 121) that allows users to view digital media items (e.g., digital video items, digital images, electronic books, web pages, etc.).

In some embodiments, platform 120 can be a communication services platform that facilitates communication between two or more entities of system 100, as described herein. For example, platform 120 can be or otherwise include a Software-as-a-Service (SaaS) platform that provides one or more services, such as communication services, to one or more client devices 106 associated with users of platform 120. Communication services can include, but are not limited to, voice services, messaging services (e.g., short message service (SMS) services, multimedia message service (MMS) services, etc.), electronic mail (e-mail) services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, landline communication network, etc.), or a combination thereof, to transfer communication data between parties. In some embodiments, communications operations may be supported, at least in part, by network 104 and/or another network of or accessible to entities of system 100.

An entity can include or otherwise correspond to one or more clients that can access resources and/or services hosted by platform 120, in some embodiments. In some instances, an entity can refer to an individual user (e.g., that accesses resources or services of platform 120 for personal or professional tasks) of platform 120, an enterprise user of platform 120, and so forth. For purposes of explanation and illustration only, an entity is referred to as a "user" herein. However, this is not intended to be limiting, as embodiments of the present disclosure can be applied to any type of entity of a system such as system 100.

As described above, platform 120 can be or otherwise include a SaaS platform that provides one or more services, such as communication services, to one or more client devices 106 associated with users of platform 120. For example, platform 120 may deliver, license, and/or otherwise support an application (e.g., application 121) on a subscription basis while also hosting, at least in part, the application. The licensed application can, at least in part, be hosted on infrastructure including, but not limited to, cloud computing resources of the SaaS platform.

Platform 120 can maintain one or more accounts associated with each client and/or user of system 100 (also referred to herein as a "client account"). A client account is a data object that is representative of the unique user that has access to a resource and/or service of platform 120. A client account may store or otherwise include information pertaining to the user, which can include, but is not limited to, identification data associated with the user (e.g., a username, etc.), contact information for the user, settings and permissions pertaining to the user's access to resources or services provided and/or supported by platform 120, and so forth. In some embodiments, platform 120 can store data and/or information pertaining to client accounts of users of platform 120 at data store 110.

Platform 120 may enable communication between users upon establishment of a trusted relationship between client accounts of the users, in accordance with embodiments described herein. A trusted relationship refers to a secure and reliable connection established between two or more users, which is based on mutual authentication, authorization, and/or encrypted communication channels to ensure that communications exchanged between the two or more users are authorized and secure. In some embodiments, a trusted relationship between two or more entities can be indicated by settings and permissions of client accounts for the entities. For example, a client account of a respective user can include one or more settings or permissions that identify one or more users that the respective user is permitted to communicate with (e.g., per the establishment of a trusted relationship) and/or one or more constraints associated with the permitted communication, as described in further detail herein.

As illustrated in FIG. 1, platform 120 can include a relationship establishment engine 131 and/or a relationship management engine 141. Relationship establishment engine 131 can facilitate the establishment of a trusted relationship between client accounts of two or more users of platform 120. Relationship management engine 141 can manage communication between users of platform 120, in view of the trusted relationship established between the client accounts of the users. In some embodiments, platform 120 can receive a first request from a user of a client device 106 (e.g., a client device 106A) associated with a first client account of platform 120 to establish a trusted relationship between a second client account and a third client account of the platform 120. The second client account can be associated with a user of a client device 106B and the third client account can be associated with a user of a client device 106C, in some embodiments. In an illustrative example, the first client account can be associated with an individual user of platform 120 and the second client account can be associated with an enterprise user (e.g., an organizational user) of platform 120. The request can be to establish the trusted relationship between the second client account and the third client account, which can be associated with an additional individual user of platform 120.

Upon receiving the request, relationship establishment engine 131 can identify the client device 106 associated with the third client account based on information included in the request. For example, the request can include an address (e.g., a network address, etc.) associated with client device 106C and/or contact information (e.g., a telephone number, an email address, etc.) associated with a user of client device 106C. Further details regarding identifying the client device 106 associated with the third client account are described herein. Upon identifying the client device 106 associated with the third client account (e.g., client device 106A), relationship establishment engine 131 can transmit a request to client device 106C to establish the trusted relationship between the second client account and the third client account. In some embodiments, relationship establishment engine 131 can receive a response to the request from client device 106C. The request can indicate whether the user of client device 106C has authorized or otherwise agreed to establishment of the trusted relationship between the second client account and the third client account. Relationship establishment engine 131 can determine whether the establishment of the trusted relationship is authorized by the user based on the response to the request. In other or similar embodiments, relationship establishment engine 131 may determine whether the establishment of the trusted relationship is authorized based on whether client device 106C provides a response to the request within a particular time period. Further details regarding the authorization of the trusted relationship by a user of client device 106C are described herein.

In some embodiments, relationship establishment engine 131 can determine whether one or more response criteria pertaining to the request sent to client device 106C are satisfied based on a response (or lack of response) received from client device 106C. For example, relationship establishment engine 131 can determine that the one or more response criteria are satisfied upon determining that client device 106C transmitted a response to the request indicating that the establishment of the trusted relationship is accepted or otherwise authorized. In another example, relationship establishment engine 131 can determine that the one or more response criteria are not satisfied upon determining that the client device 106C transmitted a response to the request indicating that the establishment of the trusted relationship is not accepted or is not authorized and/or determining that client device 106C has not transmitted a response to the request within a particular time window following the transmittal of the request to client device 106C. Upon determining that the response criteria are satisfied, relationship establishment engine 131 can update one or more entries of a data structure associated with platform 120 (e.g., stored at memory 110) to indicate that the trusted relationship is established between the second client account and the third client account. The entries can be associated with the first client account (e.g., that initiated the establishment of the trusted relationship) and the second client account and/or the third client account, in some embodiments. In an illustrative example, relationship establishment engine 131 can update a value of a counter of an entry associated with the first client account to reflect the trusted relationship established between the second client account and the third client account. Further details regarding the data structure and information pertaining to the first client account, second client account, and third client account are described herein.

Upon establishment of the trusted relationship between the second client account and the third client account, relationship establishment engine 131 and/or relationship management engine 141 can perform one or more communication operations to enable communication between client device 106B and client device 106C, in accordance with the trusted relationship. A communication operation can be an operation that enables communication of messages from client device 106B to client device 106C, in some embodiments. In an illustrative example, relationship establishment engine 131 and/or relationship management engine 141 can perform a communication operation to transfer to client device 106B an address (e.g., a network address) associated with client device 106C and/or contact information associated with a user of client device 106C, to enable client device 106B to exchange communication messages (e.g., SMS messages, MMS messages, e-mail messages, etc.) with client device 106C. In some embodiments, client device 106B and/or client device 106C can provide data pertaining to communications between client device 106B and client device 106C to relationship management engine 141. For example, client device 106B and/or client device 106C can provide to relationship management engine 141 data indicating content of the communications between client device 106B and client device 106C. Relationship management engine 141 can update the entries of the data structure (e.g., residing at data store(s) 110) based on the data provided by client device 106B and/or client device 106C. Further details regarding relationship management engine 141, communication between client device 106B and client device 106C and the data added to the data structure are described herein.

As illustrated in FIG. 1, relationship establishment engine 131 and/or relationship management engine 141 can be maintained or otherwise managed by platform 120. In such embodiments, relationship establishment engine 131 and/or relationship management engine 141 may reside on one or more computing systems (e.g., server machines) associated with platform 120. In other or similar embodiments, relationship establishment engine 131 and/or relationship management engine 141 can reside at one or more server machines (e.g., server machine 130, 140) connected to platform 120 (e.g., via network 104). For purposes of example and illustration only, relationship establishment engine 131 may be described to reside at server machine 130 and relationship management engine 141 may be described to reside at server machine 140. It should be noted, however, that relationship establishment engine 131 and/or relationship management engine 141 may reside at any server machine or computing system of or otherwise connected to system 100. It should also be noted that, in some embodiments, relationship establishment engine 131 and/or relationship management engine 141 may reside at the same server machine (e.g., at server machine 130, or at server machine 140). Further details regarding relationship establishment engine 131 and relationship management engine 141 are described herein with respect to FIGS. 2 and 7.

In some embodiments, platform 120 can enable users to request the establishment of a trusted relationship between client accounts and/or access data pertaining to established relationships via an application 121. For example, platform 120 can provide client devices 106 with one or more user interfaces (UIs) 104 of application 121 (e.g., UIs of FIGS. 4A-4E, FIGS. 7A-7B, etc.). A user of a client device 106 can engage with one or more elements of the UI 104 of application 121 to initiate a request to establish a trusted relationship between two or more client accounts of platform 120, as described herein. In additional or alternative embodiments, a user of a client device 106 can provide authorization for establishment of the trusted relationship via one or more UIs 103 of application 121. In yet additional or alternative embodiments, a user may access data pertaining to the trusted relationships established upon a request by the user via one or more UIs 103 of application 121. In yet additional or alternative embodiments, a user may provide an indication of one or more relationship criteria pertaining to relationships initiated or otherwise established by another user of platform 120, as described herein. Further details regarding application 121 and the UIs 103 of application 121 are described herein.

In some embodiments, client devices 106 can communication with platform 120 using one or more function calls, such as application programming interface (API) function calls (also referred to as "API" calls herein). For example, the one or more function calls can be identified in a request using one or more application layer protocols, such as a HyperText Transfer Protocol (HTTP) (or HTTP secure (HTTPS)), and that are sent to platform 120 from the client device 106. Platform 120 can respond to the requests from client device 106 using an application layer protocol.

It should be noted that in some embodiments, a client device 106 can be identified by a memory address and/or contact information associated with a user of client device 106, as described above. In additional or alternative embodiments, a client device 106 can be identified by a uniform resource identifier (URI), such as a uniform resource locator (URL). For example, platform 120 can send an API call to the client device 106 addressed to a URL specific to the client device 106. In some embodiments, platform 120 can be identified by a URI. For instance, the API call sent by a client device 106 to platform 120 can be directed to the URL of platform 120.

In some embodiments, the platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, platform 120 may include multiple computing devices that together may form or otherwise include a hosted computing resource, a grid computing resource or any other distributed computing arrangement. In some embodiments, platform 120 may correspond to an elastic computing resource where the allotted capacity of processing, network, storage, or other computing-related resources may vary over time.

In some embodiments, platform 120 provides one or more API endpoints that can expose services, functionality or content of the platform 120 to one or more of client devices 106. In some embodiments, an API endpoint can be one end of a communication channel, where the other end can be another system, such as a client device 106. In some embodiments, the API endpoint can include or be accessed using a resource locator, such a universal resource locator (URL), of a server or service. The API endpoint can receive requests from other systems, and in some cases, return a response with information responsive to the request. In some embodiments, HTTP or HTTPS methods can be used to communicate to and from an API endpoint.

As illustrated in FIG. 1, system 100 can include a predictive system 180, in some embodiments. Predictive system 180 can implement one or more artificial intelligence (AI) and/or machine learning (ML) techniques related to communications between client devices 106 of system 100. Further details regarding predictive system 180 are provided herein with respect to FIG. 11.

In some implementations, platform 120, server machine 130, server machine 140, and/or predictive system 180 may operate on one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components. In some implementations, the functions of platform 120, server machine 130, server machine 140, and/or predictive system 180 may be provided by a more than one machine. For example, in some implementations, the functions of relationship establishment engine 131 and/or relationship management engine 141 may be provided by two or more separate server machines.

In general, functions described in implementations as being performed by platform 120 can also be performed on the client devices 106 in other implementations, if appropriate. In addition, the functionality attributed to a particular component can be performed by different or multiple components operating together. Platform 120 can also be accessed as a service provided to other systems or devices through appropriate application programming interfaces, and thus is not limited to use in websites.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In situations in which the systems discussed here collect personal information about users, or can make use of personal information, the users can be provided with an opportunity to control whether platform 120 collects user information. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the platform 120.

Although embodiments of the disclosure are discussed in terms of communication service platforms and/or SaaS platforms, embodiments may also be generally applied to any type of platform, system or service.

Figure 2:
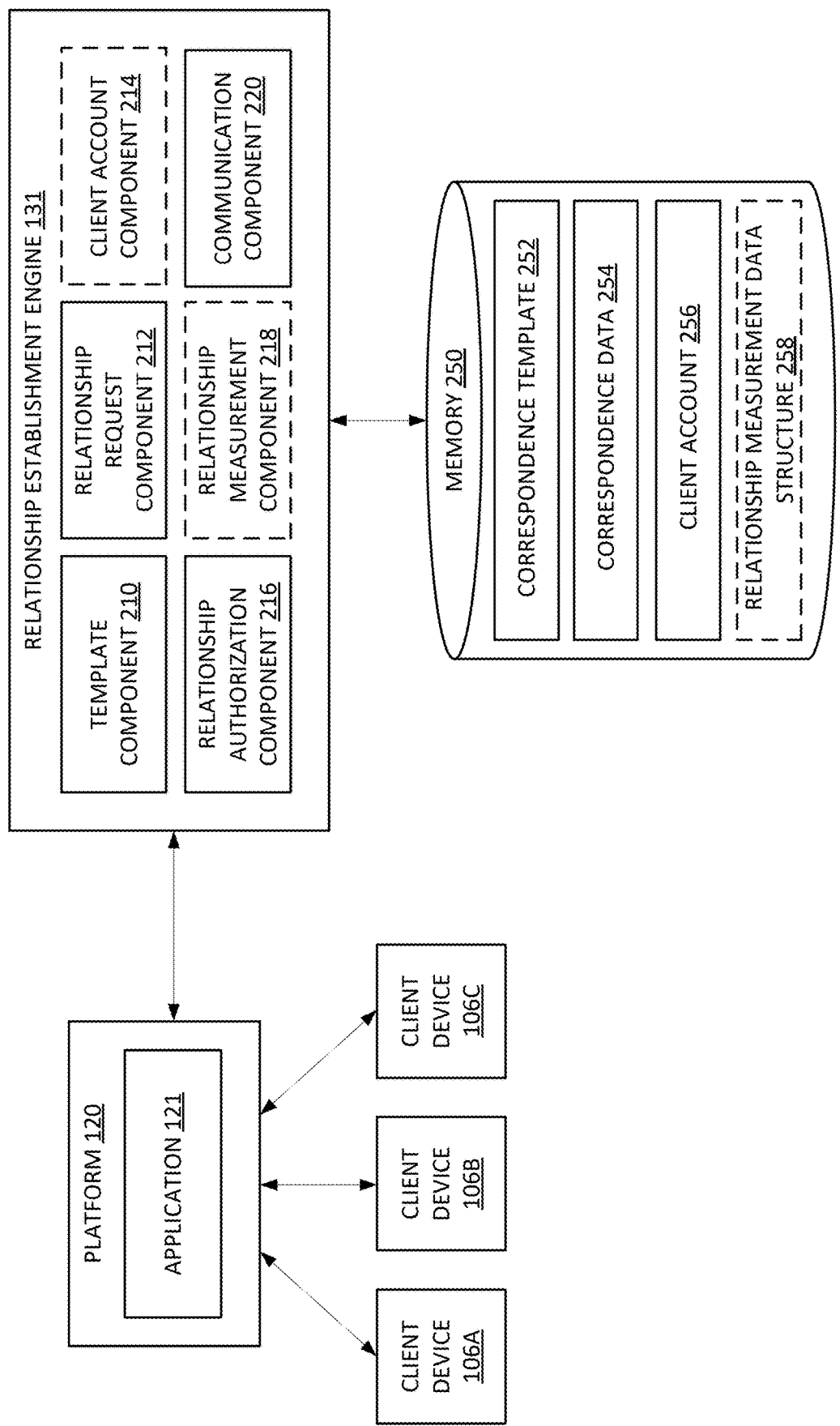
FIG. 2 is a block diagram of an example platform and an example relationship establishment engine, according to aspects of the present disclosure.

FIG. 2 is a block diagram of an example platform 120 and an example relationship establishment engine 131, according to aspects of the present disclosure. As described above, platform 120 can include a communication services platform and/or a SaaS platform, in some embodiments. As illustrated, in FIG. 2, platform 120 can be connected or otherwise accessible to one or more client devices 106 (e.g., via network 104). Some embodiments and examples below are described with respect to a first client device (e.g., client device 106A), a second client device (e.g., client device 106B), and/or a third client device 106C. However, it should be noted that embodiments and examples of the present disclosure can be applied with respect to any client device 106.

As illustrated in FIG. 2, platform 120 and/or relationship establishment engine 131 can be connected to (or otherwise have access to) memory 250. Memory 250 can include any portion of memory associated with system 100. For example, memory 250 can include one or more portions of data store 110, in some embodiments. In other or similar embodiments, memory 250 can include or be included in memory 550 described with respect to FIG. 5.

In some embodiments, client device 106A can be associated with a first client account for a first user of platform 120, client device 106B can be associated with a second client account for a second user of platform 120, and client device 106C can be associated with a third client account for a third user of platform 120. In an illustrative example, the first user of platform 120 can be an individual user, the second user of platform 120 can be an enterprise user, and the third user of platform 120 can be an individual user. The first user, in some instances, can be associated with the second user in some capacity (e.g., the first user has a personal or professional relationship with a representative of the second user, etc.). Additionally or alternatively, the first user, in some instances, can also be associated with the third user in some capacity (e.g., the first user has a personal relationship with the third user). In some examples, the first user may want to establish a connection between the second user and a third user. Relationship establishment engine 131 can facilitate the establishment of the connection by forming a trusted relationship between the second client account of the second user and the third client account of the third user, in accordance with embodiments described herein.

It should be noted that although some embodiments and examples are described with respect to the formation of the trusted relationship between the second user (e.g., the enterprise user) and the third user (e.g., the individual user) per a request initiated by a first user of platform 120, such embodiments and examples can be applied to the establishment of any type of trusted relationship between client accounts of a platform (e.g., a SaaS platform). Such embodiments and examples are not intended to be limiting and are provided for purposes of explanation and illustration only.

As described above, relationship establishment engine 131 can facilitate the establishment of a trusted relationship between client accounts of two or more users of platform 120. In accordance with embodiments and examples described below, relationship establishment engine 131 can facilitate establishment of a trusted relationship between client accounts of a user associated with client device 106B and a user associated with client device 106C (e.g., upon the request of a user associated with a client device 106A). It should be noted, however, that embodiments and examples of the present disclosure can be applied to facilitate the establishment of a trusted relationship between client accounts of users of any client device 106, as described herein.

As illustrated in FIG. 2, relationship establishment engine 131 can include a template component 210, a relationship request component 212, a client account component 214, a relationship authorization component 216, a relationship measurement component 218, and/or a communication component 220. The dashed lines of client account component 212 and relationship measurement component 218 indicate that one or more operations associated with client account component 212 and/or relationship measurement component 218 can be performed by relationship establishment engine 131 and/or relationship management engine 141, as described herein. Embodiments and examples pertaining to relationship establishment engine 131 are described with respect to FIG. 3 and FIGS. 4A-4E.

Figure 3:
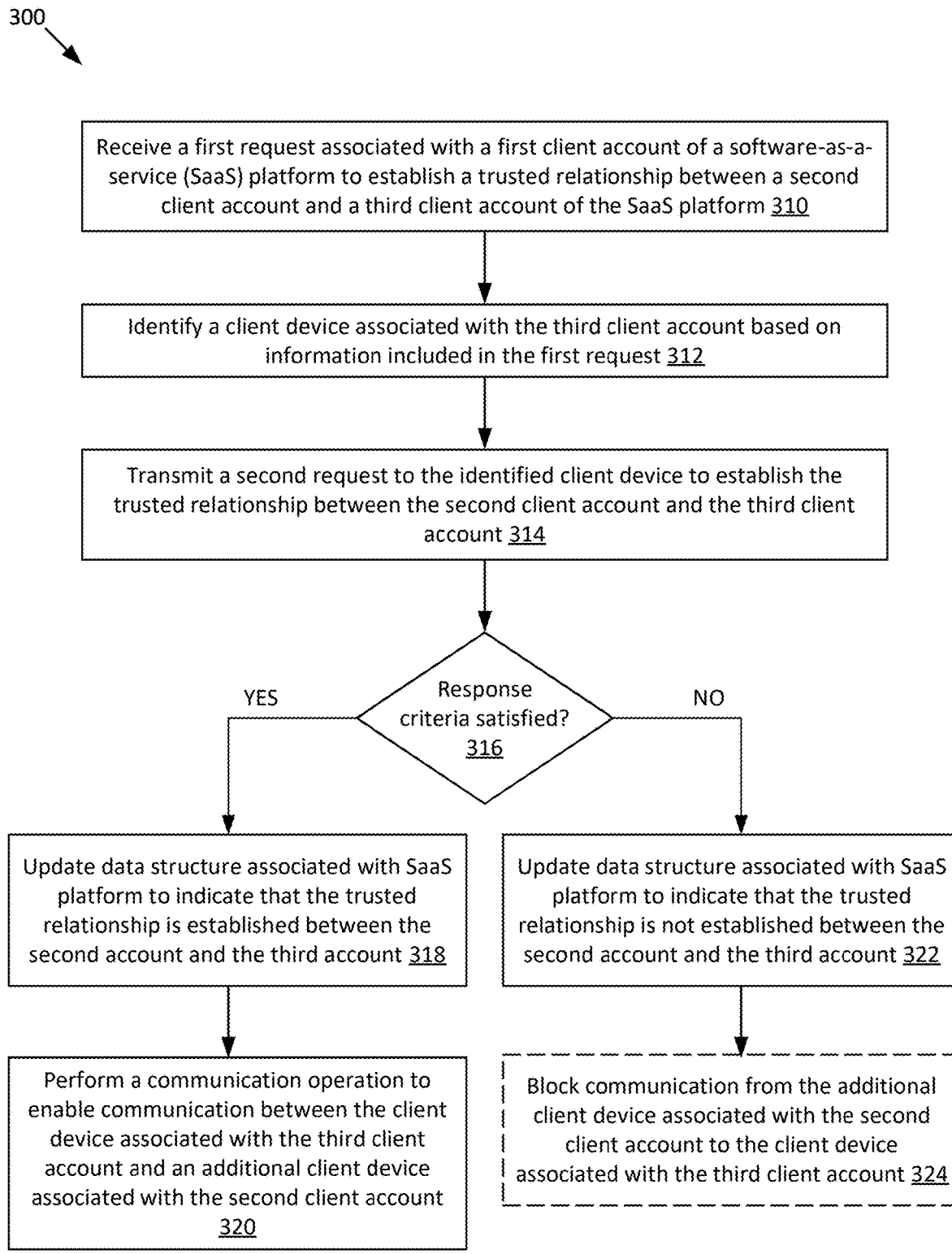
FIG. 3 flow diagram for an example method of establishing a trusted relationship between entities of a software-as-a-service (SaaS) platform, according to aspects of the present disclosure.

FIG. 3 flow diagram for an example method 300 of establishing a trusted relationship between entities of a SaaS platform, according to aspects of the present disclosure. Method 300 may be performed by processing logic that may include hardware (circuitry, dedicated logic, etc.), software (e.g., instructions run on a processing device), or a combination thereof. In some embodiments, some or all the operations of method 300 may be performed by one or more components of system 100 of FIG. 1. In some embodiments, some or all operations of method 300 may be performed by relationship establishment engine 131 of FIG. 1 and FIG. 2, as described herein.

For simplicity of explanation, method 300 is depicted and described as a series of acts. However, acts in accordance with this disclosure can occur in various orders and/or concurrently, and with other acts not presented and described herein. Furthermore, not all illustrated acts can be performed to implement method 300 in accordance with the disclosed subject matter. In addition, those skilled in the art will understand and appreciate that method 300 could alternatively be represented as a series of interrelated states via a state diagram or events. Additionally, it should be appreciated that method 300 disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, processing logic receives a first request associated with a first client account of a platform (e.g., a SaaS platform) to establish a trusted relationship between a second client account and a third client account of the SaaS platform. As described above, the first client account can be associated with a first client device (e.g., client device 106A). Platform 120 can receive the first request (e.g., via network 104) based on a user selection of one or more UI elements of a UI 104 provided to client device 106A by application 121.

FIGS. 4A-4E illustrate example UIs 400 of application 121, according to aspects of the present disclosure. For purposes of example and illustration only, UIs 400 are depicted as UIs of a mobile application (e.g., accessible via a mobile device, such as a smartphone or a tablet). However, UIs 400 and/or elements of UIs 400 can be provided to any type of client device 106 according to any configuration, according to embodiments of the present disclosure.

In some embodiments and example, the UIs 400 provided to client device(s) 106 can be customized for a particular user of platform 120. For example, UIs 400 can be customized for the second user (e.g., an enterprise user) associated with client device 106. In some embodiments, UIs for respective users can have the same or similar UI elements, but the design and/or information provided by the UI elements can be different for each respective user (e.g., based on customization settings provided by a respective user). In other or similar embodiments, a respective user can obtain or otherwise provide UI elements that are unique from UI elements of UIs 400 of other users of platform 120. In the illustrative embodiments and examples provided below, the second user can be or can otherwise correspond to a car dealership. UIs 400 can be customized for the car dealership and/or can provide functionality relating to facilitating connections between representatives of the car dealership and user of platform 120 that have a connection (e.g., a personal relationship) with a patron of the car dealership. It should be noted that such examples referring to a car dealership or any similar type organization are provided for the purpose of example and illustration herein and are not intended to be limiting. Such examples and embodiments can be applied to any type of enterprise (e.g., an academic organization, etc.) and/or for facilitating any types of connections between client accounts of users of platform 120.

Figure 4B:
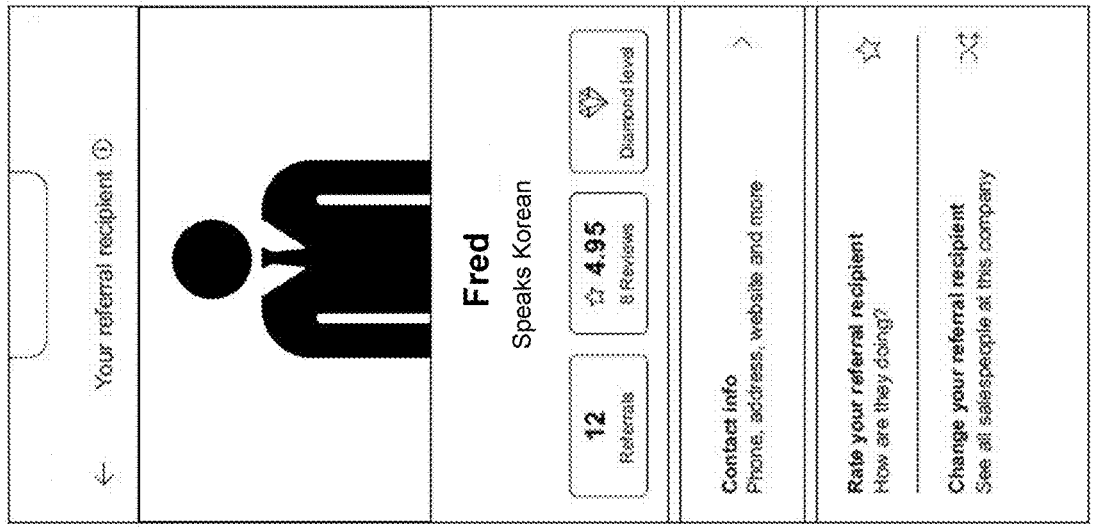
FIGS. 4A-4E illustrate example user interfaces (UIs), according to aspects of the present disclosure.
Figure 4A:
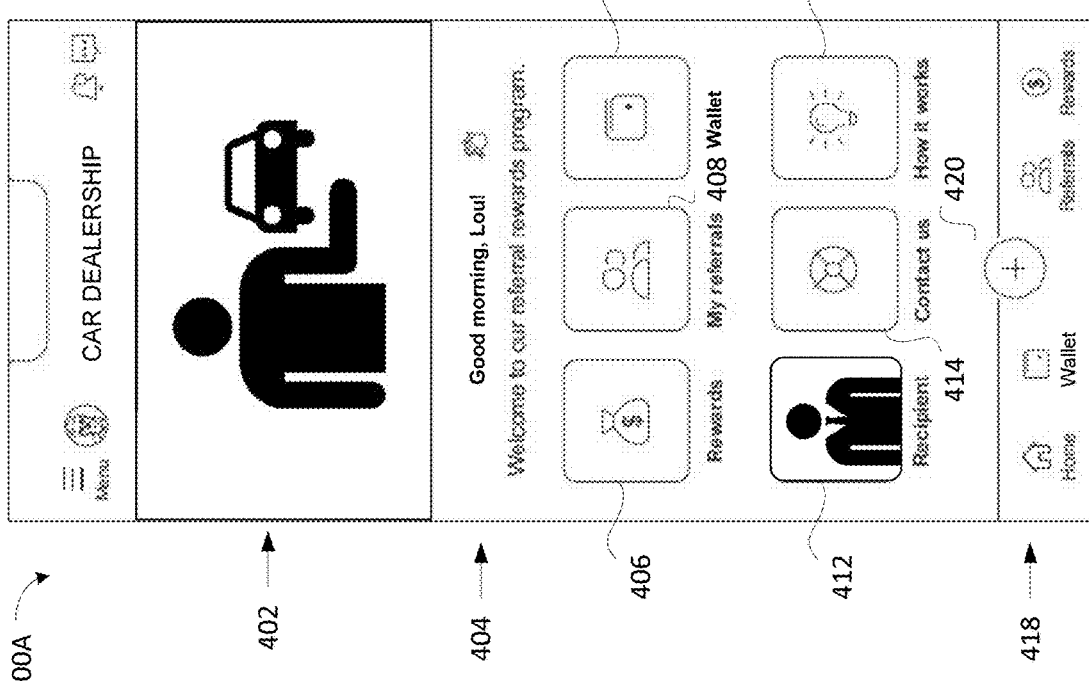

FIG. 4A illustrates a UI 400A of application 121. As illustrated in FIG. 4A, UI 400A can include one or more sections, such as section 402 and/or section 404. Section 402 can include information pertaining to one or more users (e.g., enterprise users, etc.) of platform 120. For example, as illustrated in FIG. 4A, section 402 can include information pertaining to the second user (e.g., a car dealership) associated with client device 106B. In some embodiments, section 402 can include an identifier associated with the second user (e.g., a name, a logo, etc.), an indication of a geographic location associated with the second user (e.g., an address, a region of operation, etc.), contact information associated with the second user (e.g., a phone number, an email address, etc.), image data associated with the second user (e.g., an image depicting the car dealership, one or more images depicting representatives of the car dealership, etc.).

Section 404 can include one or more UI elements that enable a user (e.g., the first user) to initiate a request to establish a connection between the second user and one or more other users (e.g., a third user) of platform 120 and/or access data pertaining to connections initiated by the user. In an illustrative example, section 404 can include an opportunities UI element 406, a referrals UI element 408, a transfer UI element 410, a connection UI element 412, a contact UI element 414, and/or an information (e.g., "how it works") UI element 416. Upon detecting an engagement with any of UI elements 406-416, client device 106 can provide a UI 400 associated with the respective UI element for presentation to a user. For example, upon detecting a user engagement with referrals UI element 408, client device 106 can provide a UI (e.g., UI 700D of FIG. 7D) for presentation to a user. Details regarding each UI element of section 404 and the associated UIs will be provided in accordance with embodiments and examples described below. It should be noted that the UI elements of section 404 are provided for the purpose of example and illustration only. Section 404 of UI 400A can include additional UI elements and/or fewer UI elements, according to embodiments described herein. Further, UI elements can be included in other sections (e.g., section 402, etc.) of UI 400A, in additional or alternative embodiments.

In some embodiments, UI 400A can additionally include a section 418, that includes one or more additional UI elements. In an illustrative example, section 418 can be or can otherwise correspond to a navigation bar that includes UI elements that enable a user to navigate to different UIs (e.g., UI 400B-400F). As will be seen later, section 418 and the corresponding additional UI elements may be included in other UIs. According to the example UI 400A of FIG. 4A, section 418 can include a home UI element, a transfer UI element, a connection UI element, and/or a balance UI element. Some UI elements of section 418 can correspond to (e.g., provide the same functionality as) elements of section 404. For example, section 418 can include a transfer UI element that corresponds to transfer UI element 410, a referrals UI element that corresponds to referrals UI element 408, and/or an opportunities UI element that corresponds to opportunities UI element 406. In another example, section 418 can include a home UI element. Upon detection of user engagement with the home UI element, client device 106 can provide UI 400A for presentation to the user.

In some embodiments, UI 400A can include a request initiation UI element 420 that enables a user to initiate a request to establish a connection between client accounts of platform 120, as described herein. UI element 420 can be included in any section of UI 400A. As illustrated in FIG. 4A, UI element 420 can be included in (or overlap with) section 418 of UI 400A. In some embodiments, UI element 420 can be included in other UIs (e.g., with the navigation bar of section 418).

In some embodiments, platform 120 can provide UI 400A to client device 106A associated with a first user. The first user can engage with UI element 420 to initiate a request to establish a connection between client accounts of the second user and the third user. In some embodiments, UI 400A can indicate a representative of the second user for which the connection is to be established. For example, connection UI element 412 can include or otherwise indicate a representative (e.g., employee, volunteer, acquaintance, etc.) of the second user that, upon establishment of the trusted relationship, will be able to communicate with the third user. Connection UI element 412 can include an identifier associated with the representative, an image depicting the representative, and/or other information pertaining to the representative. Upon detecting a user engagement with the connection UI element 412, client device 106A can provide UI 400B of FIG. 4B for presentation to the first user. As illustrated in FIG. 4B, UI 400B can include additional information associated with the representative of the second user. For example, UI 400B can include an identifier associated with the representative (e.g., the representative's name), an image depicting the representative, an indication of one or more characteristics associated with the representative (e.g., "speaks Korean"), an indication of a number of connections established on behalf of the representative with other users of platform 120, an indication of metrics collected based on the connections established on behalf of the representative (e.g., reviews provided for the representative, a rating or ranking associated the representatives, etc.). In additional or alternative embodiments, UI 400B can include contact information associated with the representative and/or a UI element that, when selected by a user, causes client device 106A to present contact information for the representative to the first user. In yet additional or alternative embodiments, UI 400B can include one or more UI elements that enable the first user to provide feedback (e.g., a review, a rating, etc.) for the representative.

In some embodiments, UI 400B can include one or more UI elements that enable the first user to select a different representative of the second user that will be able to communicate with the third user. Upon detecting a user selection of such UI element(s), client device 106A can identify client accounts associated with other representatives of the second user and can present a UI element pertaining to each account to the first user. The user can select a UI element corresponding to a client account for a representative that the first user wishes to facilitate the connection. Upon detecting the user selection, client device 106A can provide a UI (e.g., UI 400B or similar) for presentation to the user, where the provided UI includes information pertaining to the selected representative. In such embodiments, UI element 412 of UI 400B may be updated to include information pertaining to the selected representative. Upon establishment of the trusted relationship between the second user and the third user, the selected representative may be authorized to communicate with the third user, as described herein.

As described above, the first user can engage with UI element 420 to initiate a request to establish a connection between client accounts of the second user and the first user. In some embodiments, client device 106A can provide example UI 400CA of FIG. 4C for presentation to the first user upon detection of the user engagement with UI element 420. UI 400CA can include one or more sections, including section 422 and/or section 424. In some embodiments, section 422 can include one or more UI elements (e.g., UI elements 426) that are associated with a respective form of correspondence. For example, a UI element 426A of section 422 can be associated with text message correspondence (e.g., SMS messaging, MMS messaging, etc.). In another example, a UI element 426B of section 422 can be associated with email correspondence. Other UI elements 426 of section 422 can be associated with other forms of correspondence, according to embodiments described herein.

Upon detecting a user selection of a UI element 426, template component 210 of relationship establishment engine 131 can identify a correspondence template 252 for the form of correspondence associated with the selected UI element 426. A correspondence template 252 can include default information that is included in a correspondence sent to a user of platform 120. The correspondence template 252 can additionally include one or more fields (e.g., dynamic fields, as described herein) that can be edited by a user of platform 120 and/or can populate information associated with a recipient of the correspondence. For example, one or more fields of correspondence template 252 can populate a name and/or other information associated with a recipient of the correspondence (e.g., based on the user selection of a UI element of section 424, as described below).

Figure 4C:
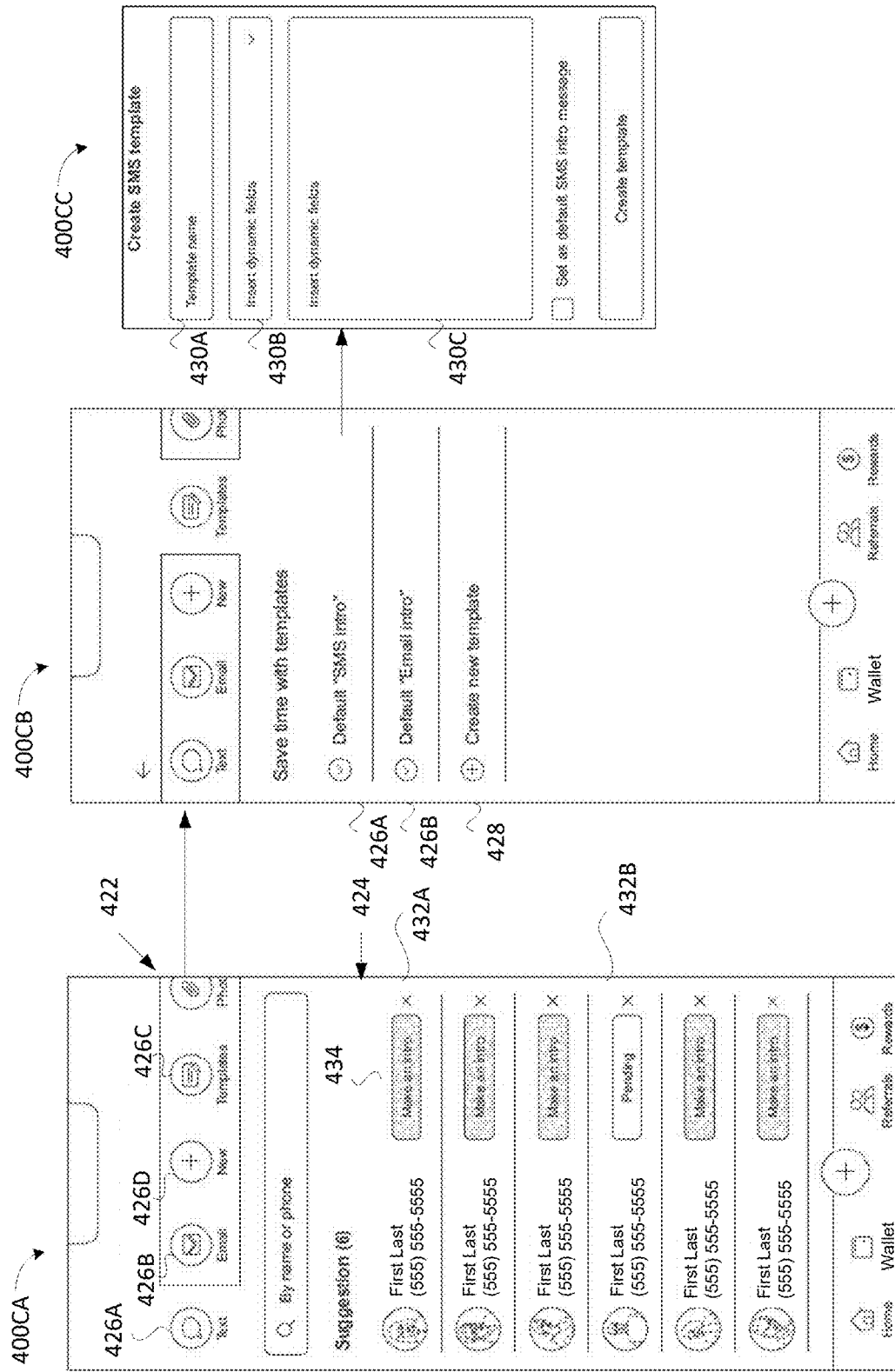

As described herein, a correspondence template 252 can be provided by the second user (e.g., an enterprise user), in some embodiments. For example, upon registering a client account for the second user, as described in further detail herein, the second user can provide one or more correspondence templates 252 to platform 120 (e.g., via client device 106B). Platform 120 can store the correspondence templates 252 at memory 250 and can retrieve a respective correspondence template 252 from memory 250 upon detection of a user selection of a UI element 426 of UI 400CA. In other or similar embodiments, the first user (e.g., an individual user) can provide the correspondence template 252 to platform 120. For example, as illustrated in FIG. 4C, section 422 can include a UI element 426 that enables a user to create and/or modify a correspondence template 252 for correspondence with other users of platform 120. Upon detection of a user selection of UI element 426C, client device 106A can provide UI 400CB for presentation to the first user. As illustrated in FIG. 4C, UI 400CB can include one or more UI elements that correspond to the correspondence templates of UI elements 426 of UI 400CA. For example, UI 400CB can include a UI element 426A that corresponds to a correspondence template 252 of UI element 426A of UI 400CA and/or a UI element 426B that corresponds to a correspondence template 252 of UI element 426B. Upon detecting a user engagement with a UI element 426 of UI 400CB, client device 106A can update UI 400CB to include the information and/or fields of the corresponding correspondence template 252. The first user of client device 106A can modify the information and/or the fields of the correspondence template 252, in some embodiments. In an illustrative example, a default "SMS intro" template and/or a default "email intro"

template may be provided to platform 120 by the second user. The first user can edit the default "SMS intro" template and/or the default "email intro" template based on a user interaction with UI elements 426A and/or 426B of UI 400CB, as described above.

In additional or alternative embodiments, UI 400CB can include a UI element 428 that enables a user to create a new correspondence template 252. Upon detection of a user interaction with UI element 428, client device 106A can provide UI 400CC for presentation to the first user. UI 400CC can include or otherwise correspond to an editable form that includes one or more fields 430A that allow a user to customize information and/or define fields of a new correspondence template 252. For example, the first user can provide a name for the correspondence template via a first field 430A of UI 400CC. In another example, the first user can select one or more dynamic fields via a second field 430B (e.g., including a drop down element) of UI 400CC. A dynamic field refers to a field of the correspondence template 252 that populates information corresponding to the recipient of the correspondence. In one example, the drop down element of second field 430B can enable the first user to specify the type of information (e.g., name, phone number, etc.) that is to be populated for the recipient of the correspondence. In an additional example, the first user can provide information and/or text of the correspondence (e.g., using a peripheral device such as a keyboard, a touch screen, etc. of client device 106A) into field 430C. In some embodiments, the first user can specify a portion of the correspondence that is to include the dynamic field (e.g., of second field 430B) via a user interaction or selection at field 430C.

Referring back to UI 400CA, section 424 can include one or more UI elements 432 corresponding to potential recipients of the correspondence from the first user. In some embodiments, the potential recipients corresponding to UI elements 432 can be identified based on a contact data structure (e.g., a contact list) associated with the first user (e.g., and residing at client device 106A). For example, client device 106A can maintain a contact list including contact information (e.g., phone numbers, email addresses, etc.) of friends, acquaintances, colleagues, family members, associates, and so forth. The first user can provide authorization for at least a portion of the contact list to be populated to respective UI elements 432 of UI 400CA. In such example, one or more of UI elements 432 can correspond to contacts of the first user's contact list. In other or similar embodiments, the first user can add and/or modify a UI element 432 to include contact information associated with a potential recipient of the correspondence. For example, the first user can engage with UI element 426D of UI 400CA to add a UI element 432 for a contact (e.g., which is not included in a contact list of the first user). Upon detecting the user engagement with UI element 426D, client device 106A can update UI 400 CA to include one or more fields to enable the first user to provide contact information associated with the potential recipient. A UI element 432 may be added to section 424 pertaining to the potential recipient, in some embodiments.

The first user can select a recipient for the correspondence from the potential recipients indicated by UI elements 432, in some embodiments. In an illustrative example, each UI element 432 can include a button 434 (or other type of UI element) that enables a user to select a recipient corresponding to the respective UI element 432. The first user of client device 106A can engage with (e.g., tap, click, etc.) the button 434 of the entry corresponding to contact selected by user as a recipient of the correspondence. For example, to select the contact associated with UI element 432A as a recipient of the correspondence, the first user can engage with button 434 of UI element 432A. The contact associated with the UI element 432A corresponds to the third user, as described herein. In some embodiments, the button 434 may be updated to reflect that the correspondence with the respective participant is pending (e.g., upon detecting that a user has selected the button 434 of the corresponding entry). In an illustrative example, the first user may have previously engaged with button 434 of UI element 432B to select the contact associated with UI element 432B as the recipient of the correspondence. Upon detecting the user engagement with the button 434 of UI element 432B and/or correspondence has been sent to a client device 106 associated with the contact, client device 106A can update UI 400CA to reflect that the correspondence with the contact of UI element 432B is pending.

Upon detecting a user interaction with a button 434 (or other UI element) of UI element 432A, client device 106A can provide UI 400D for presentation to the first user. UI 400D can include information of the correspondence template 252 selected by the first user (e.g., per the user engagement with UI elements 426 and/or 428 of UIs 400CA and 400CB). For example, the correspondence template selected by the first user can include the following information and dynamic fields: "Hey [dynamic field-recipient first name], I'd like you to meet [dynamic field-name of representative] from [dynamic field-name of second user] (cc'd here). They helped me with my car purchase and exceeded my expectations. If you're in the market, they're worth talking to. Here's a link to their website: [dynamic field-uniform resource link (URL) for website)]. Feel free to reach out." Upon detecting the user interaction with button 434 for the UI element 432A of a particular contact, client device 106A can provide UI 400D for presentation to the user, where the dynamic fields of the correspondence are populated with information associated with the contact (e.g., the third user) and the representative of the second user. In an illustrative example, the name of the second user can be "Car Dealership," the first name of the representative of "Car Dealership" can be "Fred," and the first name of the third user can be "Courtney." In such example, the correspondence of UI 400D can include the following: "Hey Courtney, I'd like you to meet Fred from Car Dealership (cc'd here). They helped me with my car purchase and exceeded my expectations. If you're in the market, they're worth talking to. Here's a link to their website: www.cardealership.com. Feel free to reach out." In some embodiments, the correspondence of UI 400D can be edited by the first user. For example, the first user can edit the correspondence of UI 400D to include an image depicting an interaction (e.g., a sale) between the first user and the representative of the second user. In some embodiments, UI 400D can include one or more UI elements that enable the first user to initiate editing of the correspondence and/or selecting a document or file for attachment to the correspondence.

In some embodiments, the correspondence can include a UI element 436 that, when selected by a user, initiates a communication operation between the third user and the representative of the second user. As will be described later, upon receipt of the correspondence from the first user, the third user can engage with the UI element 436 to initiate communication with the representative of the second user. The initiation of communication with the representative of the second user can be indicative of authorization of the trusted relationship between the second user and the third user, as described below.

UI 400D can include an additional UI element 438 that enables the first user to initiate transmission of the correspondence to the client device 106 associated with the third user (e.g., client device 106C). The initiation of the transmission of the correspondence can correspond to a request by the first user to establish the trusted relationship between the second user and the third user. Upon detecting the user engagement of UI element 438, client device 106A can transmit the request to platform 120 to establish the trusted relationship between the second user and the third user, as described herein. The request can include or otherwise indicate an identifier and/or contact information associated with the third user (e.g., as provided by the first user or as obtained from the contact list of the first user), in some embodiments.

Referring back to FIG. 2, relationship request component 212 can receive the request to establish the relationship between the second user and the third user (e.g., responsive to the selection of UI element 438 by the first user). As noted above, the request can include or otherwise indicate an identifier and/or contact information (e.g., a phone number, an email address, etc.) associated with the third user. Relationship request component 212 can store the identifier and/or the contact information at memory 250 as correspondence data 254.

In some embodiments, memory 250 may store a client account 256 (or information pertaining to a client account 256) associated with the third user. Client account component 212 of relationship establishment engine 131 may identify the client account 256 associated with the third user based on the identifier and/or contact information of the request received by relationship request component 212. For example, memory 250 may store a data structure (not shown) that includes entries that store a mapping between an identifier or contact information associated with a user and an identifier for a client account 256 pertaining to that user. Client account component 212 may identify the client account 256 associated with the third user based on a mapping including the identifier or contact information of the request. In other or similar embodiments, a client account 256 for the third user may not have been created at the time the request is received. For example, client account component 212 may parse the data structure to identify an entry corresponding to the identifier or contact information of the request and may determine that such entry is not included in the data structure. Upon determining that the client account 256 for the third user has not yet been created, client account component 212 may generate or otherwise create a client account 256 associated with the third user. In some embodiments, client account component 212 may generate or create the client account 256 by identifying default client account data and/or settings (e.g., as provided by a developer or engineer of platform 120) and associating the default client account data and/or settings with a client account identifier associated with the third user. For purposes of example and illustration only, the first client account associated with the first user is referred to herein as client account 256A, the second client account associated with the second user is referred to herein as client account 256B, and the third client account associated with the third user is referred to herein as client account 256C.

In some embodiments, client account component 212 can update the client account 256C associated with the third user to indicate that a request has been received to establish the trusted relationship with the client account 256B of the second user. In an illustrative example, client account component 212 can update one or more settings (e.g., a flag) of the client account 256C to indicate that the request to establish the trusted relationship with the client account 256B of the second user is received.

Referring back to FIG. 3, at block 312, processing logic identifies a client device associated with the third client account based on information included in the first request. In accordance with embodiments described herein, the third client account can include client account 256C associated with the third user and the first request can correspond to the request received by relationship component 212. In some embodiments, relationship request component 212 can identify the client device associated with the third client account 256C based on a network communication protocol. For example, a phone number can be associated with a particular client device 106 per a network communication protocol established by a carrier of the communication network. The request received by relationship request component 212 can include a phone number associated with the third user, and therefore, relationship request component 212 can identify the client device (e.g., client device 106C) associated with the third user based on the network communication protocol for the cellular communication network associated with client device 106C. In another example, a client device 106 may access an email account associated with a user based on secure credential provided by the user for the email account. Relationship request component 212 can identify a client device that has access to an email account associated with the email address of the request.

At block 314, processing logic transmits a second request to the identified client device to establish the trusted relationship between the second client account and the third client account. Relationship request component 212 of relationship establishment engine 131 can cause the second request to be transmitted to the identified client device (e.g., client device 106C). For example, relationship request component 212 can forward the second request including a correspondence from the first user to client device 106C (e.g., as an email, a SMS message, a MMS message, etc.). Network 104 can transmit the request according to a networking protocol associated with the request (e.g., a cellular communication protocol, Wi-Fi communication protocol, etc.). The second request can include the correspondence described with respect to FIG. 4D. For example, the second request can include the correspondence of UI 400D, which includes the following message: "Hey Courtney, I'd like you to meet Fred from Car Dealership (cc'd here). They helped me with my car purchase and exceeded my expectations. If you're in the market, they're worth talking to. Here's a link to their website: www.cardealership.com. Feel free to reach out."

In some embodiments, client device 106C can present the correspondence from the first user according to a communication format associated with the correspondence. For example, if the correspondence is transmitted to client device 106C as a SMS message or a MMS message, the correspondence can be presented to the user of client device 106C via a SMS messaging, or MMS messaging application for the client device 106C. In another example, if the correspondence is transmitted to client device 106C as an email message, the correspondence can be presented to the user of client device 106C via an email application for client device 106C. It should be noted that client device 106C can present the correspondence via any type of application or any technique associated with presenting information to a user of a client device.

In some embodiments, relationship request component 212 can cause the second request to be transmitted to client device 106C for presentation via an application UI associated with platform 120. For example, upon receiving the second request, client device 106C can present information of the request to the third user via the application UI associated with platform 120. The third user can authorize or reject the trusted relationship via one or more UI elements associated with the application UI, as described below. In other or similar embodiments, relationship request component can, upon receiving the correspondence addressed to the third user, convert the correspondence to a format corresponding to another application of client device 106A and can present the correspondence to the first user via a UI of the other application. For example, the first user associated with client device 102A can designate the message of the second request to be transmitted to client device 102C of the third user as a SMS message. Upon receiving the message and the designation via the application UI provided by platform 120, relationship request component 212 can identify another application of client device 102A associated with SMS communication (e.g., a native SMS application of client device 102A). Relationship request component 212 can, in some instances, copy the content of the message provided by the first user via the application UI to a message UI element of the native SMS application of client device 102A. In some instances, relationship request component 212 can update a recipient UI element of the native SMS application to include an identifier or address (e.g., a phone number, an email address, etc.) associated with the third user (e.g., as included in an address book or contact list associated with client device 102A). Relationship request component 212 can copy the identifier or address associated with the third user based on information provided via the UI elements of the application UI of platform 120 (e.g., information of UI 400D). In other or similar embodiments, the first user can engage with one or more UI elements of the native application (e.g., an "add contact" or "add recipient" UI element) to select a contact (e.g., the third user). Upon detecting the engagement with the one or more UI elements, relationship request component 212 or another component of the native application can update the recipient UI element to include the identifier or address associated with the third user. Relationship request component 212 can additionally or alternatively include an identifier or an address associated with the second user in the recipient UI element of the native SMS application. Relationship request component 212 can include the identifier or address associated with the second user in the recipient UI element, as described above.

In some embodiments, relationship request component 212 can transmit the second request to client device 106C via the SMS application. For example, a user of client device 102A can engage with one or more UI elements of the SMS application (e.g., a "send" button, etc.) to initiate transmittal of the second request to client device 106C via the SMS application. Upon receipt of the second request, client device 106C can present information of the request to the third user via a SMS application of client device 106C (e.g., a native SMS application of client device 106C or another SMS application that is the same or similar to the SMS application of client device 106A).

It should be noted that the above described embodiments can be applied to any type of communication application of client devices 106A, 106B, and/or 106C. For example, information or a message of the second request, provided by the first user of client device 106A, can be converted and/or copied to a native application of client device 106A, such as a native SMS application, a native email application, a social media application, and so forth, and transmitted to a corresponding application of client device 106C (e.g., a corresponding native SMS application, a corresponding native email application, a corresponding social media application, etc.), as described above.

In some embodiments, client device 106C can provide, with the presented correspondence, one or more UI elements that enable the third user to authorize or reject the trusted relationship between the second client account and the third client account. In other or similar embodiments, client device 106C may not provide any UI elements with the correspondence (e.g., other than the UI elements associated with the SMS messaging application, the MMS messaging application, the email application, etc.). Further details regarding the authorization or rejection of the second request by the third user are described below.

At block 316, processing logic determines whether one or more response criteria associated with the second request are satisfied. In some embodiments, relationship authorization component 216 of relationship establishment engine 131 can determine whether the one or more response criteria associated with the second request are satisfied by determining whether a response to the second request is received during a particular time period following the transmittal of the second response to the third client device 106C and/or determining whether the response indicates that the third user associated with the third client account has authorized the establishment of the trusted relationship between the second client account and the third client account. As noted above, client device 106C can include one or more UI elements associated with authorizing or rejecting the establishment of the trusted relationship with the correspondence presented to the third user. The third user can engage with (e.g., select, click, tap, etc.) the one or more UI elements to authorize or reject the establishment of the trusted relationship. Upon detecting that the third user has engaged with a UI element associated with authorizing the trusted relationship within the particular time period following the transmittal of the second request, relationship authorization component 216 can determine that the one or more response criteria associated with the second request are satisfied. Upon detecting that the third user has engaged with a UI element associated with rejecting the trusted relationship (e.g., within the particular time period or outside of the particular time period), relationship authorization component 216 can determine that the one or more response criteria associated with the second request are not satisfied.

In other or similar embodiments, client device 106C may not include any additional UI elements associated with accepting or rejecting the request with the presented correspondence, as described above. In such embodiments, the third user can accept or reject the second request by responding to the correspondence (e.g., via the SMS messaging application, the MMS messaging application, the email application etc.) with a messaging indicating that the request is accepted. For example, in response to the correspondence described above with respect to FIG. 4D, the third user (e.g., Courtney) can respond with a message of "Thank you for the introduction. It is great to meet you, Fred! I look forward to working with you." In some embodiments, client device 106C may transmit the message of the third user to relationship establishment engine 131. Relationship authorization component 216 may determine a sentiment or context of the message to determine whether the third user has accepted the request to establish the trusted relationship. Relationship authorization component 216 can determine that the one or more criteria associated with the second request are satisfied upon determining that the third user has accepted the request to establish the trusted relationship, as described herein.

In some embodiments, relationship authorization component 216 can determine the sentiment or context of the message by parsing the content of the message and identifying one or more content items of the content as key words or phrases that are indicative of the sentiment or context of the message (e.g., based on rules provided by an engineer or developer of platform 120, based on historical or experimental messages received by platform 120, etc.). For example, relationship authorization component 216 can parse through the content of the message from the third user and can identify "great to meet you" and "looking forward to working" as key words or phrases in the message. Relationship authorization component 216 can determine that the identified key words or phrases have a positive sentiment (e.g., based on the provided rules, and/or historical or experimental messages of platform 120), which indicates that the third user has authorized the establishment of the trusted relationship, and therefore the one or more criteria are satisfied. In another example, the message received from the third user can include "I am not interested. Thanks." Relationship authorization component 216 can parse through the content of the message from the third user and can identify "not interested" as key words or phrases of the message. Relationship authorization component 216 can determine that the identified key words or phrases have a negative sentiment (e.g., based on the provided rules, and/or historical or experimental messages of platform 120), which indicates that the third user has rejected the establishment of the trusted relationship, and therefore the one or more criteria are not satisfied.

Relationship authorization component 216 can determine the sentiment or context of the message according to additional or alternative techniques. For example, relationship authorization component 216 may provide the message of the third user as input to a machine learning model trained to predict a sentiment associated with content of a message (referred to as a sentiment analysis model). Relationship authorization component 216 can obtain one or more outputs of the sentiment analysis model that indicate a sentiment (e.g., positive, negative, indifferent, etc.) for one or more words or phrases of the message. Relationship authorization component 216 can determine the sentiment of the message based on the indicated sentiment of the one or more words or phrases of the message, in some embodiments.

In additional or alternative embodiments, relationship authorization component 216 may determine that the one or more response criteria associated with the second request are not satisfied upon determining that the third user has not provided any response (e.g., by selecting a UI element, providing a message in response to the correspondence, etc.) within a particular time period after transmission of the second request. The particular time period can be defined by an engineer or developer of platform 120, in some embodiments. In other or similar embodiments, the particular time period can be determined based on historical response data and/or experimental response data for other requests transmitted to client devices 106 and/or other devices of system 100.

Responsive to a determination that the one or more response criteria are satisfied (e.g., the third user has engaged with a UI element associated with authorizing the trusted relationship, the third user has provided a response message within the particular time period that has a positive sentiment, etc.), method 300 proceeds to block 318. At block 318, processing logic updates a data structure associated with the SaaS platform to indicate that the trusted relationship is established between the second account and the third account. Processing logic can update the data structure by updating entries of the data structure that are associated with the first client account and the second client account and/or the third client account to indicate the establishment of the trusted relationship.

The data structure updated by processing logic can include relationship measurement data structure 258, in some embodiments. As indicated above, relationship establishment engine 131 may include relationship measurement component 218 that is configured to manage data pertaining to trusted relationships established between client accounts of platform 120 and the client accounts associated with the initiation of the trusted relationships. In some embodiments, relationship measurement data structure 258 can include one or more entries each corresponding to a respective client account of platform 120. Each entry can include one or more fields that indicate an identifier for a corresponding client account (referred to as an identifier field), one or more fields that indicate other client accounts for which a trusted relationship is established (referred to as a relationship field), one or more fields that indicate other client accounts for which a trusted relationship has been rejected (e.g., referred to as a rejection field), and one or more fields that indicate trusted relationships between other client accounts that have been initiated by a user associated with the corresponding client account (referred to as the initiation field).

In some embodiments, relationship measurement component 218 can identify a first entry of relationship measurement data structure 258 that corresponds to the first client account associated with the first user of client device 106A. Upon identifying the first entry associated with the first client account, relationship measurement component 218 can update the initiation field of the first entry to indicate that the trusted relationship has been established between the second client account and the third client account. In some embodiments, the initiation field of an entry of relationship measurement data structure 258 can include a value of a counter that indicates a total number of trusted relationship initiated by the user of the corresponding client account. Relationship measurement component 218 can update the initiation field of the first entry by updating the value of the counter (e.g., by incrementing by a value of 1). In other or similar embodiments, relationship measurement component 218 can update the initiation field of the first entry by updating the first entry to include a mapping between first client account and the second client account. The mapping can indicate that a trusted relationship was established for the second client account on behalf of the first user associated with the first client account.

As will be described in further detail below, a trusted relationship between two or more client accounts can be associated with one or more relationship phases, where each relationship phase corresponds to a respective relationship criterion, in some embodiments. In such embodiments, the entries of relationship measurement data structure 258 can include one or more additional fields that each correspond to a respective relationship phase. For example, an entry of data structure 258 can include an additional field corresponding to an introduction phase, an additional field corresponding to an engagement phase, one or more additional fields each corresponding to respective action phases, and so forth. Relationship measurement component 218 can update the additional fields corresponding to relationship phase of which a relationship criterion is satisfied, in accordance with embodiments described below.

In some embodiments, relationship measurement component 212 can identify a second entry of relationship measurement data structure 258 that corresponds to the second client account associated with the second user of client device 106B and a third entry of relationship measurement data structure 258 that corresponds to the third client account associated with the third user of client device 106C. Relationship measurement component 212 can update the relationship field of the second entry to include a mapping between the second client account and the third client account, indicating the trusted relationship established between the second client account and the third client account, in some embodiments. In other or similar embodiments, relationship measurement component 212 can update the relationship field of the third entry to include a mapping between the third client account and the second client account, indicating the trusted relationship established between the second client account and the third client account.

It should be noted that embodiments and examples with respect to relationship measurement data structure 258 are provided for explanation and illustration, and are not intended to be limiting. Relationship measurement data structure 258 can include entries that are organized or configured according to other techniques, in accordance with embodiments of the present disclosure. For example, each entry of relationship measurement data structure 258 can correspond to a established trusted relationship (e.g., rather than corresponding to a respective client account) and can include one or more fields that indicate client accounts for which the trusted relationship is established and/or the client account associated with the user that initiated the client account. In additional or alternative embodiments, relationship measurement data structure 258 can be a distributed ledger, such as distributed ledger 800 of FIG. 8.

Referring back to FIG. 3, at block 320, processing logic performs a communication operation to enable communication between the client device associated with the third client account and an additional client device associated with the second client account. Upon relationship authorization component 216 determining that the third user of third client device 106C has authorized the establishment of the trusted relationship, communication component 220 of relationship establishment engine 131 can perform one or more operations that enable client device 106B to communicate with client device 106C. The one or more operations can include any operation that enables client device 106B to transmit messages or other such communications to client device 106C via network 104. In one example, the correspondence send to client device 106C by the first user can be included in a group SMS message that includes the first user, the second user, and the third user. The second user may not be able to transmit any messages to the third user in the group SMS message, until the third user has authorized the establishment of the trusted relationship. Upon detecting that the third user has authorized the establishment of the trusted relationship, communication component 220 can execute one or more operations that enables messages transmitted from client device 106B to be received by client device 106C (and therefore accessed by the third user). In another example, communication component 220 can transmit a message to client device 106B indicating contact information (e.g., an email address, a phone number, etc.) associated with the third user (e.g., as permitted by the third user). The second user can provide messages to the third user using the contact information of the message.

As described above, a trusted relationship refers to a secure and reliable connection established between client accounts of two or more users of a computing system, which is based on mutual authentication, authorization, and/or encrypted communication channels to ensure that communications exchanged between the two or more users are authorized and secure. Upon determining that the response criteria associated with the second request are satisfied, correspondence between the client device 106B of the second user and client device 106C of the third user can be performed via a secure communication channel formed between client device 106B and client device 106C, in some embodiments. The secure communication channel can be formed based on the exchange of encryption keys between client device 106B and client device 106C, in some embodiments. In an illustrative example, client device 106B and client device 106C can exchange encryption keys according to one or more key exchange techniques or protocols (e.g., Diffie-Hellman key exchange protocol, Rivest-Shamir-Adleman (RSA) key transport protocols, pre-shared key (PSK) protocols, secure remote password (SRP) protocols, and so forth).

Referring back to FIG. 3, responsive to a determination at block 316 that the one or more response criteria are not satisfied (e.g., the third user has engaged with a UI element associated with rejecting the trusted relationship, the third user has provided a response message within the particular time period that has a negative sentiment, the third user has not provided any response to the second request within the particular time period, etc.), method 300 proceeds to block 322. At block 322, processing logic updates the data structure associated with the SaaS platform to indicate that the trusted relationship is not established between the second account and the third account. In some embodiments, relationship measurement component 218 can identify the second entry associated with the second client account and/or the third entry associated with the third client account, as described above. Relationship measurement component 218 can update the rejection field of the second entry to include a mapping between the second client account and the third client account, in some embodiments. Such mapping can indicate that the request to establish the trusted relationship between the second client account and the third client account was not authorized. In other or similar embodiments, relationship measurement component 218 can update the rejection field of the third entry to include a mapping between the third client account and the second client account, as described above.

Relationship measurement component 218 may additionally or alternatively update a field (e.g., the rejection field) of the first entry associated with the first client account to indicate that the request to establish the trusted relationship between the second client account and the third client account was not authorized, in some embodiments. For example, the rejection field (or another field) of the first entry can include a value of a counter that indicates a number of requests to initiate trusted relationships by the first user that have been rejected. Relationship measurement component 218 can update the rejection field (or the other field) of the first entry to reflect the rejection by the third user by updating the value of the counter (e.g., by incrementing the value by one). In some embodiments, relationship measurement component 218 can determine whether the value of the counter meets or exceeds a threshold number of rejected requests (e.g., as defined by a developer or operator of platform 120). In response to determining that the value of the counter meets or exceeds the threshold, relationship measurement component 218 can update the first entry to include a flag (or other such indicator) that indicates the first user is not permitted to initiate requests to establish trusted relationships between client accounts (e.g., for a particular time window in the future). Relationship establishment engine 131 may reject future requests from the first client device 106A to establish trusted relationships in view of the flag (e.g., received within the particular time window).

Referring back to FIG. 3, at block 324, processing logic, optionally, blocks communication from the additional client device associated with the second client account to the client device associated with the third client account. In some embodiments, communication component 220 can perform one or more operations that block or otherwise prevent the second client device 106B from transmitting messages to the third client device 106C. In accordance with a prior example, communication component 220 can prevent the second user included in a group SMS message with the first user and the third user from providing messages to the third user.

Figure 4E:
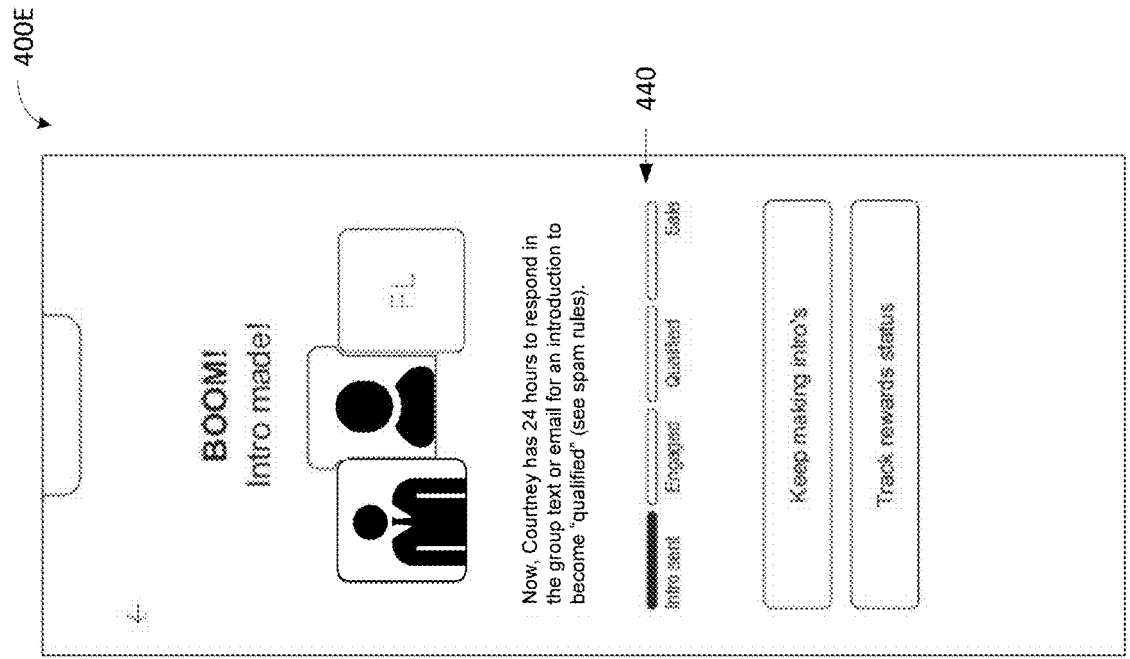
Figure 4D:
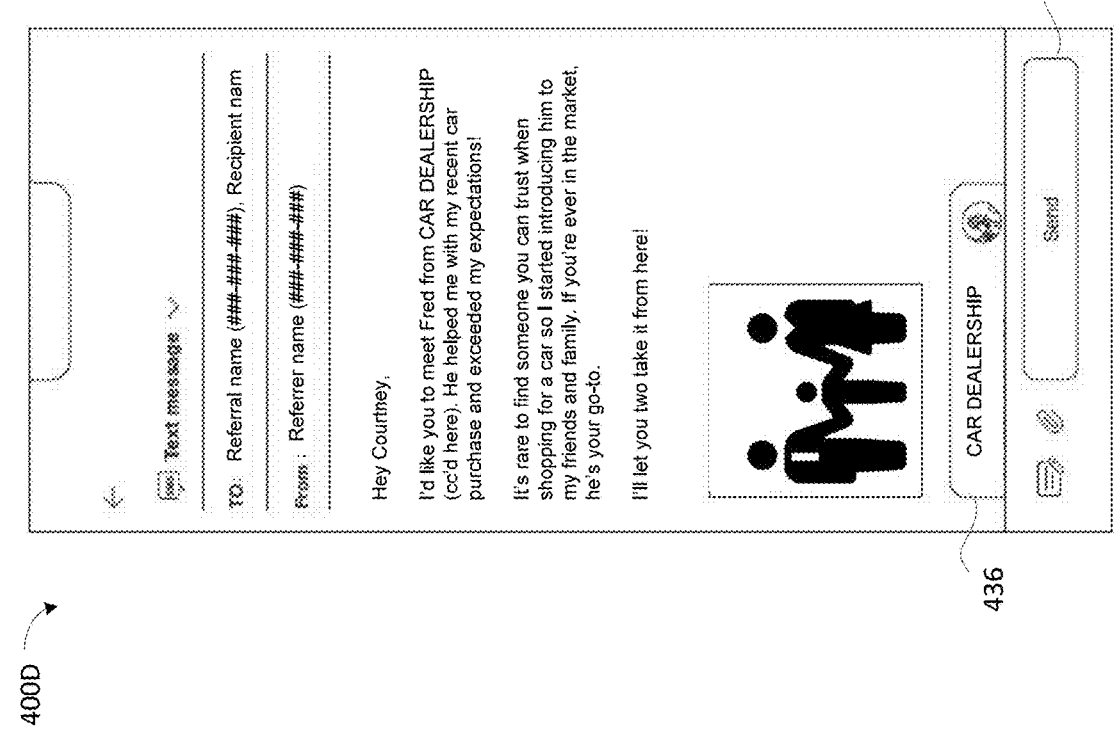

FIG. 4E depicts an example UI 400E that may be provided by platform 120 for presentation to users of client device 106A, 106B, and/or 106C. As described above, a trusted relationship between two or more client accounts can be associated with one or more relationship phases. For example, a trusted relationship can be associated with an introduction phase (e.g., a time period during or after an introduction has been initiated by the first user), an engagement phase (e.g., a time period during or after a response from the third user has been received), one or more action phases (e.g., a time period during or after the second user initiates communication with the third user, a time period during or after the second user and/or the third user participate in one or more activities), and so forth. Illustrative examples associated with the phases of a trusted relationship are provided below. UI 400E can include one or more UI elements 440 that indicate each relationship phase of the trusted relationship and, in some embodiments, indicate whether a corresponding relationship criterion associated with a respective relationship phase has been satisfied. In an illustrative example, an introduction phase can be associated with a relationship criterion of whether the first user has sent correspondence to the third user to authorize the establishment of the trusted relationship (e.g., the first request described herein). Relationship establishment engine 131 may determine that the relationship criterion is satisfied once the first user sends the correspondence to the third user. In such illustrative example, platform 120 can update UI 400E to indicate that the relationship criterion associated with the introduction phase is satisfied (e.g., as illustrated in FIG. 400E, the UI element 440 above "intro sent" is highlighted). In some embodiments, the relationship phase for a trusted relationship can be managed and/or evaluated by relationship management engine 141, as described herein.

It should be noted that UI 440E can include UI elements 440 that indicate additional or different statuses than those illustrated by FIG. 4E. For example, UI elements 440 can indicate one or more of an "intro sent" status (e.g., indicating that an introduction, or the second request, has been sent to client device 106C), an "engaged" status (e.g., indicating that the third user of client device 106C has engaged with or responded to the second request, as described above), a "qualified" status (e.g., indicating that the third user of client device 106C is a "qualified" referral, in accordance with rules or policies of platform 120), a "reward issued" status (e.g., indicating that one or more rewards have been issued to the first client account associated with the first user"), an activity status (e.g., indicating that the third user has participated in an activity corresponding to the trusted relationship, including but not limited to agreeing to or making a "deal" with the second user, initiating or closing a "sale" with the second user, etc.), and so forth. In additional or alternative embodiments, UI elements 440 can include multiple elements 440 indicating the same or similar status. For example, UI elements 440 can include a "reward issued" status element associated with an "engaged" or "qualified" status element, indicating a reward issued to the first client account upon satisfaction of one or more conditions associated with the "engaged" or "qualified" relationship stats, as described herein. UI elements 440 can additionally or alternatively include a "reward issued" status element associated with an activity status element, indicating a reward issued to the first client account upon satisfaction of one or more conditions associated with the activity relationship status.

As described above, in some embodiments, relationship request component 212 can transmit the second request to client device 106C via a native application (e.g., via a native SMS application, a native email application, etc.) or other type of communication application (e.g., a social media application, etc.) of client device 106A. In such embodiments, UI elements 440 can include an additional status element indicating that the second request has been transmitted to client device 106C via the native communication application of client device 106A.

Figure 5:
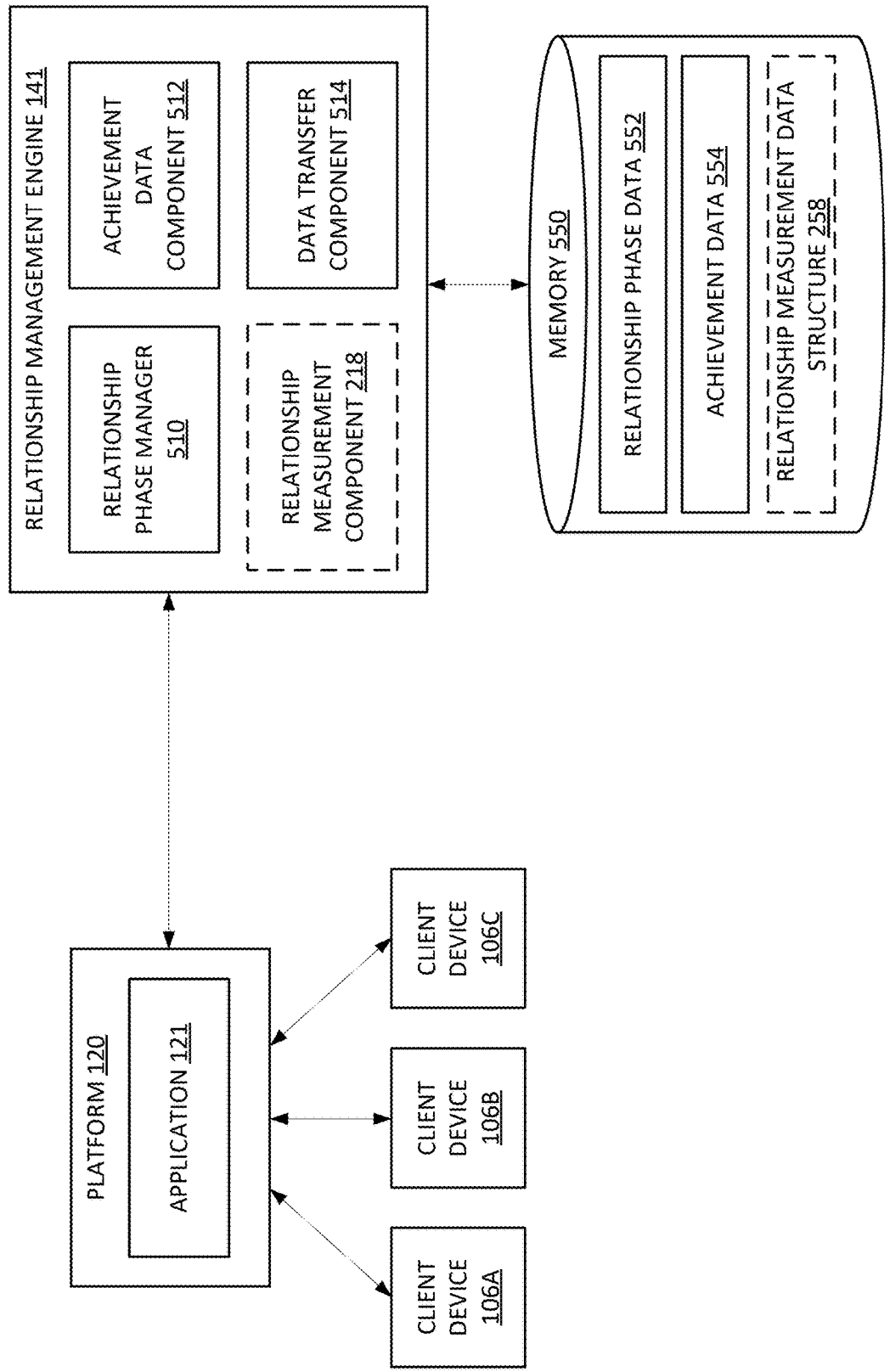
FIG. 5 is a block diagram of an example platform and an example relationship management engine, according to aspects of the present disclosure.

FIG. 5 is a block diagram of an example platform 120 and an example relationship management engine 141, according to aspects of the present disclosure. As described above, platform 120 can include a communication services platform and/or a SaaS platform, in some embodiments. As illustrated in FIG. 2, platform 120 can be connected or otherwise accessible to one or more client devices 106 (e.g., via network 104). In accordance with prior embodiments and examples, client device 106A is referred to as a first client device of a first user associated with a first client account of platform 120, client device 106B is referred to as a second client device of a second user associated with a second client account of platform 120, and client device 106C is referred to as a second client device of a second user associated with a second client account of platform 120. It should be noted that embodiments and examples of the present disclosure can be applied with respect to any client device 106.

As illustrated in FIG. 5, platform 120 and/or relationship management engine 141 can be connected to (or otherwise have access to) memory 550. Memory 550 can include any portion of memory associated with system 100. For example, memory 550 can include one or more portions of data store 110, in some embodiments. In other or similar embodiments, memory 550 can include or be included in memory 250 described with respect to FIG. 2.

As described above, relationship management engine 131 can manage communication between users of platform 120, in view of the trusted relationship established between the client accounts of the users. In accordance with embodiments and examples described below, relationship management engine 141 can manage communication between users of the second client account and the third client account of which a trusted relationship has been established according to embodiments described above. It should be noted, however, that embodiments and examples of the present disclosure can be applied to manage communication between any client accounts of platform 120 (e.g., regardless of whether a trusted relationship has been established).

Figure 6:
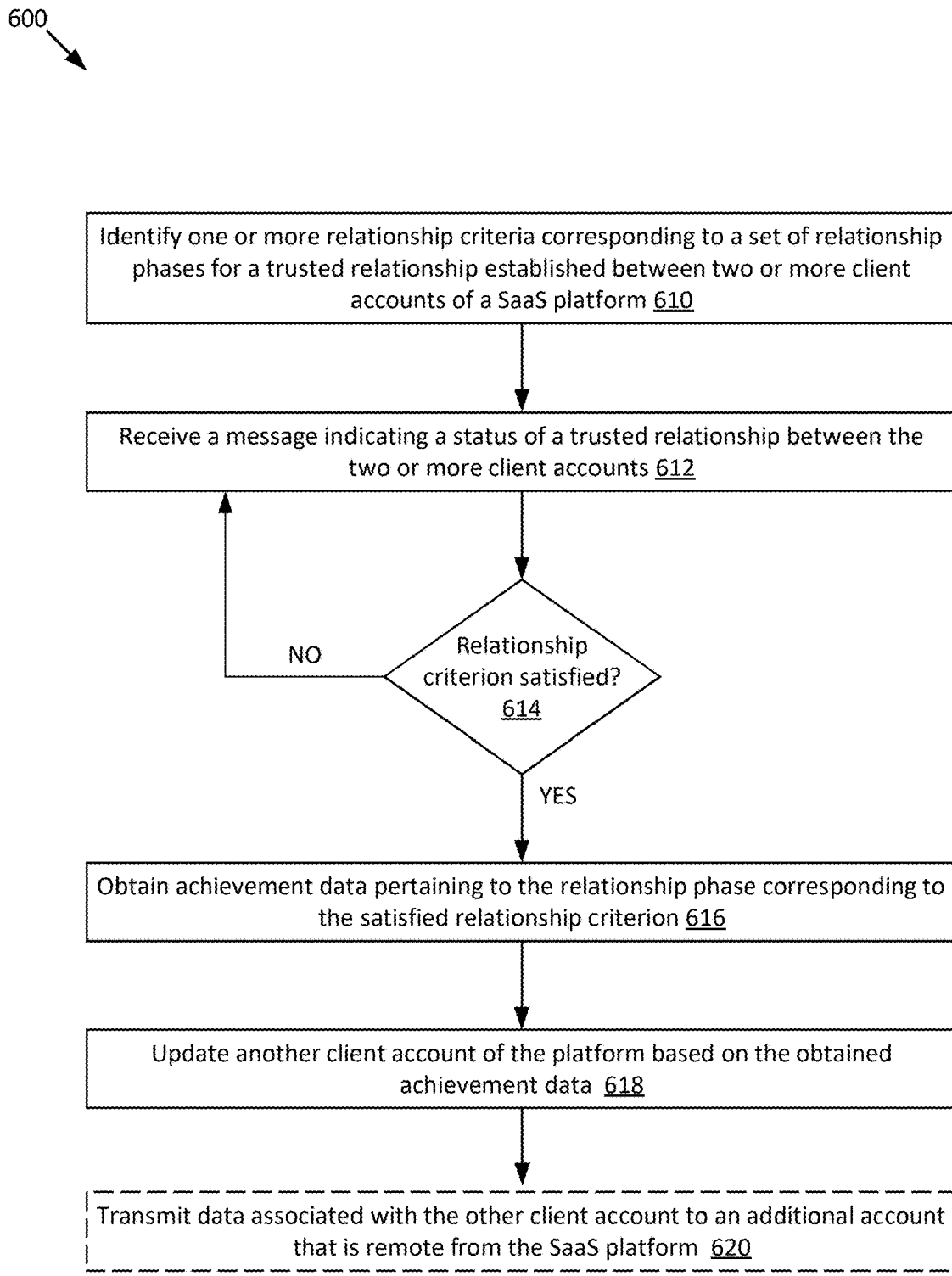
FIG. 6 flow diagram for an example method of managing trusted relationships between entities of a software-as-a-service (SaaS) platform, according to aspects of the present disclosure.
Figures 7A, 7B:
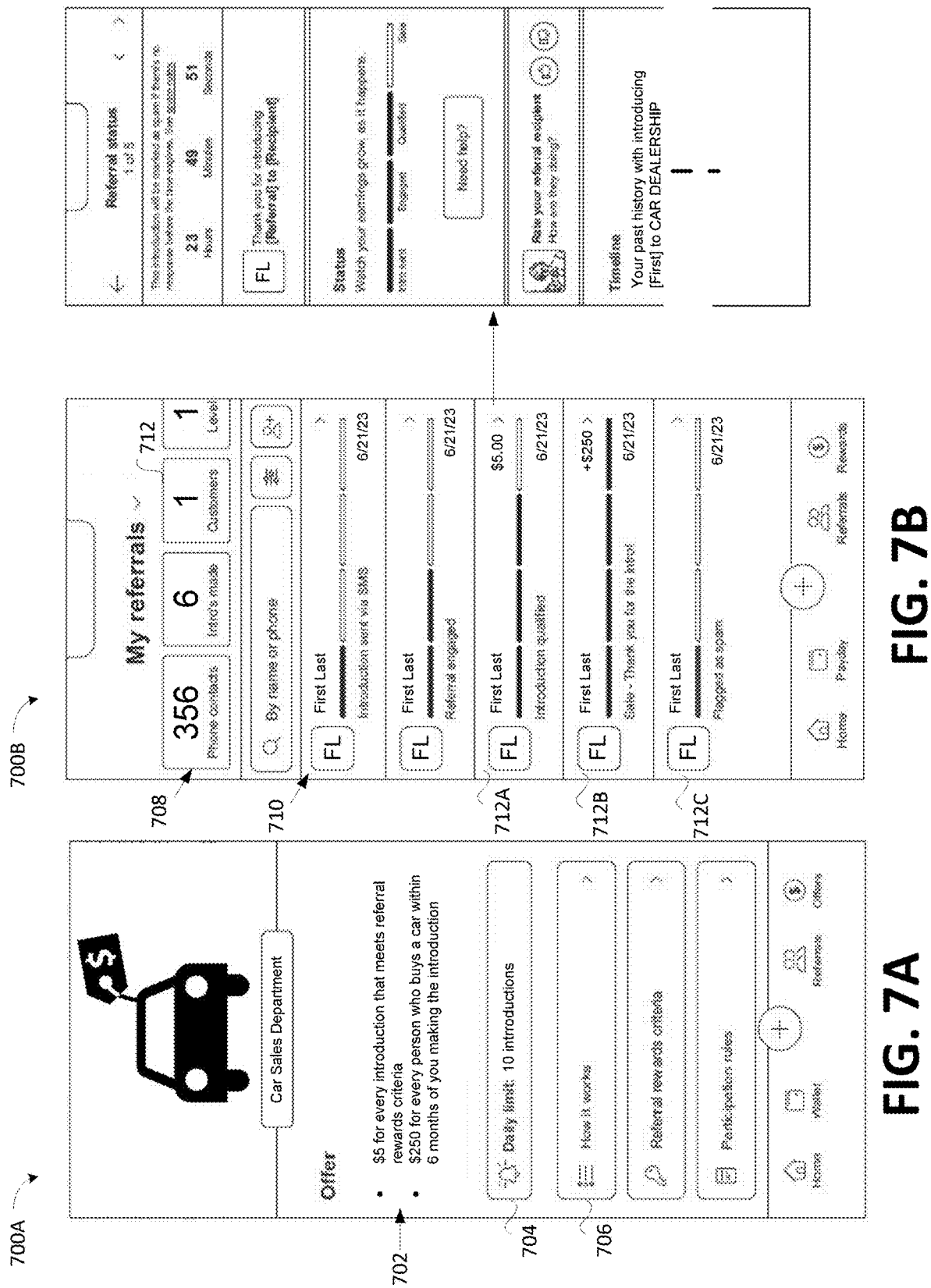
FIGS. 7A-7B illustrate additional example UIs, according to aspects of the present disclosure.

As illustrated in FIG. 5, relationship management engine 141 can include a relationship phase manager 510, an achievement data component 512, and/or a data transfer component 514. In additional or alternative embodiments, relationship management engine 141 can include at least a portion of relationship measurement component 218. As described with respect to FIG. 2, the dashed lines of relationship measurement component 218 indicate that one or more operations associated with relationship measurement component 218 can be performed by relationship establishment engine 131 and/or relationship management engine 141, as described herein. Embodiments and examples pertaining to relationship establishment engine 131 are described with respect to FIG. 6 and FIGS. 7A-7B FIGS. 7A-7B illustrate example UIs 700 of application 121, according to aspects of the present disclosure. For purposes of example and illustration only, UIs 700 are depicted as UIs of a mobile application (e.g., accessible via a mobile device, such as a smartphone or a tablet). However, UIs 700 and/or elements of UIs 700 can be provided to any type of client device 106 according to any configuration, according to embodiments of the present disclosure.

FIG. 6 flow diagram for an example method 600 of managing trusted relationships between entities of a SaaS platform, according to aspects of the present disclosure. Method 600 may be performed by processing logic that may include hardware (circuitry, dedicated logic, etc.), software (e.g., instructions run on a processing device), or a combination thereof. In some embodiments, some or all the operations of methods 600 may be performed by one or more components of system 100 of FIG. 1. In some embodiments, some or all operations of methods 600 may be performed by relationship management engine 141 of FIG. 1 and FIG. 5, as described herein.

For simplicity of explanation, method 600 is depicted and described as a series of acts. However, acts in accordance with this disclosure can occur in various orders and/or concurrently, and with other acts not presented and described herein. Furthermore, not all illustrated acts can be performed to implement method 600 in accordance with the disclosed subject matter. In addition, those skilled in the art will understand and appreciate that method 600 could alternatively be represented as a series of interrelated states via a state diagram or events. Additionally, it should be appreciated that method 600 disclosed in this specification are capable of being stored on an article of manufacture to facilitate transporting and transferring such methods to computing devices. The term article of manufacture, as used herein, is intended to encompass a computer program accessible from any computer-readable device or storage media.

At block 610, processing logic identifies one or more relationship criteria corresponding to a set of relationship phases for a trusted relationship established between two or more client accounts of a platform (e.g., a SaaS platform). As described above, a trusted relationship between two or more client accounts of platform 120 can be associated with one or more relationship phases. For example, a trusted relationship between the second client account and the third client account (e.g., established according to embodiments described above) can be associated with an introduction phase, an engagement phase, one or more action phases, and so forth. An introduction phase refers to a phase or a time period during or after an introduction has been initiated by a user of platform 120. For example, upon the client device 106A of the first user sending the correspondence to the client device 106C of the third user introducing the third user to the second user, the introduction phase may be initiated. An engagement phase refers to a phase or time period during or after a response to the introduction is received. For example, upon the third user authorizing or accepting the establishment of the trusted relationship between the second client account and the third client account, the engagement phase may be initiated. An action phase refers to a phase or time period during with one or more actions are performed with respect to a trusted relationship established between two or more client accounts. For example, an action phase can involve the third user providing particular information to the second user, in accordance with the trusted relationship, performing particular activities (e.g., networking activities, sales activities, etc.) with or on behalf of the second user, in accordance with the trusted relationship, and so forth.

In some embodiments, the set of relationship phases for a trusted relationship can be provided or otherwise defined by a user of platform 120. In accordance with prior examples and embodiments, the second user can be an enterprise user of platform 120. In some embodiments, the second user can provide a set of relationship phases (e.g., via client device 106B) for a trusted relationship established on behalf of the second user by another user of the platform 120. For example, platform 120 can provide one or more UIs (not shown) to client device 106B associated with defining the set of relationship phases for a trusted relationship. In some embodiments, platform 120 can provide the one or more UIs to the client device 106B upon creating or registering of the second client account for the second user (e.g., as an enterprise user). The second user can provide an indication of each of the set of relationship phases for the trusted relationship via one or more UI elements of the UIs. Upon detecting the second user has provided the indication of the set of relationship phases, client device 106B can transmit a message including the indicated set of relationship phases to platform 120 (e.g., via network 104).

In some embodiments, the indicated set of relationship phases can correspond to one or more relationship criteria. Each relationship criterion may correspond to a respective relationship phase of the set of relationship phases and can define one or more conditions to be satisfied in order for a respective relationship phase to begin and/or end. For example, a relationship criterion corresponding to an introduction phase can include a condition that a user is to transmit correspondence to another user of platform 120 regarding the establishment of a trusted relationship between the second user and the other user in order for the introduction phase to be initiated. In another example, a relationship criterion corresponding to the introduction phase and/or the engagement phase can include a condition that the other user that has received the correspondence is to respond to the correspondence (e.g., within a particular time period) in order for the introduction phase to end and/or the engagement phase to be initiated. The second user can provide the relationship criteria corresponding to each of the set of relationship phases via the UIs provided by platform 120 and client device 106B can provide the relationship criteria with the set of relationship phases to platform 120, in some embodiments. Upon receiving the set of relationship phases and/or the corresponding relationship criteria, relationship phase manager 510 can store the set of relationship phases and/or the corresponding relationship criteria at memory 550 as relationship phase data 552.

In other or similar embodiments, relationship phase manager 510 can obtain relationship phase data 552 according to other techniques, such as artificial intelligence (AI) and/or machine learning techniques. In an illustrative example, one or more enterprise users can provide relationship phase data 552 for trusted relationships established on their behalf, as described above. Relationship phase manager 510 can provide the relationship phase data 552 to a predictive system, such as predictive system 180, to be use for generating training data for training an AI model (and/or a ML model) to predict relationship phase data 552 for other enterprise users of platform 120 (referred to as a relationship phase model herein). In some embodiments, the training data generated based on the provided relationship phase data 552 can include one or more training inputs and one or more target outputs, where the training inputs indicate one or more characteristics associated with the enterprise user (e.g., a type of organization associated with the enterprise user, characteristics of patrons associated with the enterprise user, etc.) and the target outputs indicate the relationship phase data 552 provided by the enterprise user. Predictive system 180 can generate the training data and can provide the generated training data for training an AI model.

Another user of platform 120 (e.g., the second user) can provide characteristic data associated with the user via a UI provided by platform 120, as described above. Relationship phase manager 510 can provide the characteristic data as an input to the trained AI model and can obtain one or more outputs of the AI model. The one or more outputs can indicate relationship phase data 552 and a level of confidence that the relationship phase data 552 pertains to the characteristics of the user, as indicated by the provided characteristic data. Responsive to determining that the level of confidence satisfies one or more criteria (e.g., meets or exceeds a threshold level of confidence, etc.), relationship phase manager 510 can extract the relationship phase data 552 from the one or more outputs of the AI model and can store the relationship phase data 552 at memory 550, as described above.

In some embodiments, the second user can additionally or alternatively provide achievement data 554 associated with each relationship phase of the set of relationship phases defined by the second user. Achievement data 554 can indicate one or more achievements or awards that are to be granted to a client account of a user of platform 120 that facilitated the establishment of a trusted relationship between client accounts, in view of respective relationship criteria. Achievement data 554 can include any type of data associated with an achievement or award, such as monetary awards or non-monetary awards (e.g., badges, points, etc.).

FIG. 7A illustrates an example UI 700A of application 121. In some embodiments, UI 700A may be provided to a client device (e.g., client device 106A) accessing application 121 of platform 120. For example, UI 700A may be provided to client device 106A upon a detection that the first user has engaged with one or more UI elements of UIs 400A-400E (e.g., UI element 406 of UI 400A). As illustrated in FIG. 7A, UI 700A can include one or more sections, including at least section 702. Section 702 can indicate one or more relationship phases and or a relationship criterion corresponding to each relationship phase for another user (e.g., the second user) of platform 120. In accordance with one or more prior illustrative examples, the second user can be or otherwise correspond to a car dealership. An introduction phase and/or an engagement phase associated with the second user can involve the first user facilitating an introduction between the second user and another user (e.g., the third user) and/or the third user responding to correspondence associated with the introduction. An activity phase associated with the second user can involve the third user engaging in an activity (e.g., a sales activity) with respect to the second user within a particular time period after the introduction. Section 702 can indicate each phase associated with the trusted relationship, as illustrated in FIG. 7A. In some embodiments, Section 702 can additionally or alternatively indicate the achievements or awards associated with each relationship phase, as indicated by achievement data 554, in some embodiments.

In some embodiments, UI 700A can include one or more UI elements associated with additional information pertaining to the relationship phases and/or achievements or awards associated with trusted relationships established on behalf of the second user. For example, the second user can provide one or more conditions or constraints associated with initiating an introduction or engagement phase (e.g., a daily limit of 10 introductions). UI 700A can include a UI element 704 that indicates the one or more conditions or constraints. In another example, UI 700A can include one or more UI elements 706 that enable a user to access additional information pertaining to the establishment of a trusted relationship, as provided by the second user.

Referring back to FIG. 6, at block 612, processing logic receives a message indicating a status of a trusted relationship between the two or more client accounts. As described above with respect to FIGS. 2 and 3, upon determining that one or more response criteria associated with a request to establish a trusted relationship between the second client account and the third client account are satisfied, relationship establishment engine 131 can perform a communication operation to enable communication between client device 106B and client device 106C. In some embodiments, client device 106B and client device 106C can exchange correspondence (e.g., SMS messages, MMS messages, email messages, phone calls, etc.) in accordance with the trusted relationship. In some embodiments, platform 120 can facilitate the exchange of the correspondence between client device 106B and client device 106C. For example, application 121 of platform 120 can include a SMS and/or MMS messaging functionality. Client device 106B and/or client device 106C can transmit messages to platform 120 for forwarding to client device 106C and/or client device 106B using the SMS and/or MMS messaging functionality, in some embodiments. In such embodiments, relationship management engine 141 can receive the messages transmitted to platform 120 by client device 106B and/or client device 106C. The messages received by platform 120 can indicate the status of the trusted relationship between the second client account and the third client account, as described herein.

In other or similar embodiments, the second user and the third user can correspond using another application (e.g., a SMS messaging application, a MMS messaging application, an email application, etc.) of client devices 106. In such embodiments, platform 120 may not receive messages from client device 106B and/or client device 106C during correspondence between the second user and the third user. In such embodiments, client device 106B and/or client device 106C may transmit a message to platform 120 indicating a status of the trusted relationship between the second user and the third user (e.g., as requested by the second user and/or the third user). For example, upon initiating or performing an activity associated with the one or more relationship phases, the second user and/or the third user can update a status of the trusted relationship to indicate the initiation or performance of the activity (e.g., via a UI of platform 120). Client device 106B and/or client device 106C can transmit a message to platform 120 indicating the status of the trusted relationship, as described herein.

At block 614, processing logic determines whether the status of the trusted relationship between the two or more client accounts satisfies a relationship criterion corresponding to a respective relationship phase of the set of relationship phases for the trusted relationship. In some embodiments, relationship phase manager 510 can determine the status of the trusted relationship between the second client account and the third client account based on the received message (e.g., of block 612). As described above, the message can include correspondence between the second user and the third user, in some embodiments. In such embodiments, relationship phase manager 510 can parse the correspondence to identify key words or phrases corresponding to a respective relationship phase of the trusted relationship. For example, relationship phase manager 510 can parse the correspondence to identify key words or phrases corresponding to an engagement phase (e.g., "it's nice to meet you," "I look forward to working with you, etc.) of the trusted relationship. In another example, relationship manager 510 can parse the correspondence to identify key words or phrases corresponding to an activity pertaining to the trusted relationship (e.g., "thank you for completing your work on our project, etc.). Upon identifying key words or phrases corresponding to a respective relationship phase, relationship phase manager 510 can determine whether the status of the trusted relationship, as indicated by the identified key words or phrases, satisfies the relationship criterion corresponding to the relationship phase. For example, upon identifying the key words "it's nice to meet you" in the correspondence between the second user and the third user, relationship phase manager 510 can determine that the third user has engaged in communication with the second user (e.g., within a particular time period). Accordingly, relationship phase manager 510 can determine that the relationship criterion pertaining to the introduction and/or engagement phase has been satisfied. In another example, upon identifying the key words "thank you for completing your work on our project" in the correspondence, relationship phase manager 510 can determine that the third user has performed an activity associated with the trusted relationship. Accordingly, relationship phase manager 510 can determine that the relationship criterion pertaining to the activity phase has been satisfied. In some embodiments, relationship phase manager 510 can determine that a relationship criterion has not been satisfied if relationship phase manager 510 does not detect key words or phrases corresponding to a respective relationship phase of relationship phase data 552.

As described above, in some embodiments, the second user and/or the third user can transmit a message to platform 120 indicating the status of the trusted relationship. The message can indicate whether a relationship criterion associated with a respective relationship phase is satisfied, in some embodiments. Relationship phase manager 510 can determine whether the relationship criterion is satisfied based on the indication of the message, in such embodiments.

Responsive to a determination that the relationship criterion is not satisfied, method 600 can return to block 612, in some embodiments. In such embodiments, relationship phase manager 510 can continue to receive messages indicating the status of the trusted relationship and continue to determine whether a relationship criterion for a respective relationship phase is satisfied, as described above.

Responsive to a determination that a relationship criterion is satisfied, method 600 can proceed to block 616. At block 616, processing logic obtains achievement data pertaining to the relationship phase corresponding to the satisfied relationship criterion. As described above, achievement data 554 can indicate one or more achievements or awards that are to be granted to a client account of a user that facilitated the establishment of a trusted relationship between other client accounts, in view of respective relationship criteria. In accordance with previously described embodiments and examples, the first user associated with client device 106A may have facilitated the establishment of the trusted relationship between the second client account and the third client account (e.g., as described above with respect to FIGS. 2 and 3). As described above, the second user may provide the achievement data 554 with relationship phase data 552 (e.g., via a UI of platform 120) and such achievement data 554 may be stored at memory 550. Achievement data component 512 may identify achievement data 554 from memory 550.

At block 618, processing logic updates another client account (e.g., the first client account) of the platform based on the obtained achievement data. As described above, relationship measurement data structure 258 can include and/or organize data pertaining to client accounts of platform 120 and trusted relationships established on behalf of and/or between the client accounts. In some embodiments, one or more portions of relationship measurement data structure 258 can be stored at memory 550. Relationship measurement component 218 can identify an entry of relationship measurement data structure 258 that is associated with the first client account of the first user by parsing through the entries of data structure 258 and identifying an entry that includes an identifier for the first client account in the identifier field, in some embodiments. As described above, entries of data structure 258 can include one or more fields that each correspond to a respective relationship phase. For example, entries can include an introduction field that corresponds to the introduction phase, an engagement field that corresponds to the engagement phase, one or more activity fields that correspond to each activity phase, and so forth. Responsive to a determination that a relationship criterion corresponding to a respective relationship phase is satisfied, relationship measurement component 218 can update the relationship phase field of the entry for the first client account to indicate the status of the relationship. For example, upon determining that an engagement criterion corresponding to an engagement phase is satisfied, relationship measurement component 218 can update the engagement field of the entry for the first client account to indicate that the third user has engaged in correspondence with the second user.

In some embodiments, achievement data component 512 and/or relationship management component 218 can update the entry for the first client account to indicate achievement data 554 pertaining to the relationship phase for which the corresponding relationship criterion is satisfied. In some embodiments, achievement data component 512 can parse achievement data 554 to identify one or more data items corresponding to the relationship phase and can extract the one or more data items from the achievement data 554. The one or more data items can indicate an award or achievement to be attributed to the first client account upon satisfaction of the relationship criterion for the relationship phase. Relationship measurement component 218 can update the relationship phase field of the entry for the first client account to include or otherwise indicate the one or more data items extracted from achievement data 554, in some embodiments. In other or similar embodiments, entries of data structure 258 can include one or more additional fields that indicate achievements or awards attributed to corresponding client accounts (referred to herein as achievement fields). Relationship measurement component 218 can update the achievement field of the entry for the first client account to include or otherwise indicate the one or more data items extracted from achievement data 554. By updating an entry for the first client account to include or otherwise indicate the data items extracted from achievement data 554, relationship management engine 141 can issue the achievement or award associated with a respective relationship phase to the first client account.

FIG. 7B illustrates an example UI 700B of application 121. In some embodiments, UI 700B may be provided to client device 106A accessing application 121. For example, UI 700B may be provided to client device 106A upon a detection that the first user has engaged with one or more UI elements of UIs 400A-400E or UI 700A (e.g., UI element 408 of UI 400A). As illustrated in FIG. 7B, UI 700B can include one or more sections, including sections 708 and 710. In some embodiments, section 708 can include data associated with each trusted relationship initiated by the first user. For example, section 708 can include one or more UI elements 712 that indicate a number of introductions facilitated by the first user, a number of trusted relationships for which one or more activities have been initiated or performed, and so forth. Section 710 can include one or more UI elements 714 each corresponding to a respective trusted relationship initiated by the first user. For example, as illustrated in FIG. 7B, a first UI element 712A can correspond to a first trusted relationship initiated by the first user (e.g., between the second client account of the second user and the third client account of the third user), a second UI element 712B can correspond to a second trusted relationship initiated by the first user, and a third UI element 712C can correspond to a third trusted relationship initiated by the first user.

In some embodiments, UI elements 712 can include data pertaining to the status of the corresponding trusted relationship and/or achievement data related to the trusted relationship, in accordance with previously described embodiments. For example, in accordance with previously described embodiments, an engagement phase of the trusted relationship between the second client account and the third client account may be initiated and/or completed by the second user and the third user. UI element 712A can include data that indicates the third client account for which the trusted relationship is established, data pertaining to the initiation of the trusted relationship (e.g., a date when the trusted relationship was initiated, etc.), a relationship phase of the trusted relationship for which one or more relationship criterion have been satisfied, and/or achievement data 554 attributed to the first client account. UI elements 712 for other trusted relationships can include information pertaining to those trusted relationships, as described above. For example, UI element 712B can include data associated with a trusted relationship established between the second client account and another client account (e.g., a fourth client account) associated with another user of platform 120, as facilitated by the first user. In another example UI element 712C can include data associated with a trusted relationship initiated by the first user between second client account and another client account (e.g., a fifth client account) associated with another user of the platform 120.

As described above, in some embodiments, relationship establishment engine 131 may determine that response criteria associated with a request to establish a trusted relationship are not satisfied (e.g., per block 316 of method 300). In an illustrative example, the response criteria may not be satisfied with respect to the request to establish the trusted relationship between the second client account and the fifth client account. UI element 712C can indicate that the response criteria are not satisfied with respect to the trusted relationship between the second client account and the fifth client account (e.g., "flagged as spam").

In some embodiments, the first user can engage with one or more of UI elements 712 to access additional information pertaining to the trusted relationship established between the second client account and another client account of platform 120. For example, upon detecting a user engagement with UI element 712A, client device 106A can update UI 700B to include additional information pertaining to the trusted relationship between the second client account and the third client account. As illustrated in FIG. 7B, the additional information can include data indicating an amount of time that has passed since the initiation of the correspondence between the first user and the second user, an amount of time remaining until relationship establishment engine 131 determines that the response criteria are not satisfied, a status of each relationship phase associated with the trusted relationship, achievement data 554 pertaining to each relationship phase of the trusted relationship, an indication of correspondence between the first user, the second user, and/or the third during or after initiation of the establishment of the trusted relationship, and so forth.

In yet other or similar embodiments, the first user can engage with the one or more UI elements 712 to perform additional actions with respect to the trusted relationship corresponding to the UI element 712. For example, the first user can engage with (e.g., swipe left) a UI element 712 via the UI of client device 106A. Upon detection of the engagement, client device 106A can update UI 700B to present one or more additional UI elements each associated with an action (e.g., resend the correspondence to the user, etc.) that can be initiated with respect to the trusted relationship.

Referring back to FIG. 6, at block 620, processing logic, optionally, transmits data associated with the other client account (e.g., the first client account) to an additional account that is remote from the platform. In some embodiments, the first user of the first client account can provide a request (e.g., via client device 106A) to establish a connection between the first client account of platform 120 and another account (e.g., associated with another application) that is remote from platform 120. Examples of the other account can include, but are note limited to, an account for a social media application, an account for a human resources application, an account for a banking application, an account for a content sharing application, and so forth. In some embodiments, the first user can provide the request during or after creation of the first client account for the first user.

In some embodiments, the first user can provide a request (e.g., via client device 106A) to transmit data associated with the first client account to the other account that is remote from platform 120 (e.g., in accordance with the established connection). The data can include achievement data 554 associated with the first client account and/or any other data pertaining to trusted relationships facilitated by the first user. In one illustrative example, the first client account can be issued an award (e.g., a badge, etc.) based on the engagement or an activity phase of the trusted relationship between the second client account and the third client account, in accordance with previously described embodiments. The first user can provide a request to transfer the achievement data 554 pertaining to the award from the first client account to another account associated with a social media application of the first user. Data transfer component 514 can execute one or more operations to initiate the transfer of the achievement data 554 from the first client account to a computing system associated with the other account (e.g., via network 104). Upon completion of the one or more operations, data transfer component 514 and/or relationship measurement component 218 can update the first client account to indicate that the achievement data has been transferred to the other account. For example, relationship measurement component 218 can update an entry for the first client account to indicate that the achievement data 554 of the award has been transferred and/or can remove transferred achievement data 554 from the entry.

It should be noted that although some embodiments of the present disclosure refer to the second user as a car dealership and the first user facilitates the establishment of the trusted relationship between the car dealership and another user of platform 120, embodiments of the present disclosure can be applied to any scenario or situation involving the establishment of a trusted relationship on behalf of a user of platform 120. For example, users of platform 120 can be attendees of a conference. During the conference, a user of platform 120 can facilitate the establishment of a trusted relationship between other attendees of the conference, in accordance with embodiments described herein. In such example, an additional account of the user may be an account of a professional social networking application. Data transferred to the additional account can include a number of trusted relationship established on behalf of the user. The social networking application can update the additional account of the user to include a badge (or other type of notification) reflecting the establishment of the connection between conference attendees. In other or similar examples, a user of platform 120 can facilitate the establishment of trusted relationships between a realtor or real estate agent user and a user interested in purchasing a house, or other types of users.

In additional or alternative embodiments, application 121 can provide client devices 106 with one or more additional UIs that provide users with an indication of other users (e.g., enterprise users) that created client accounts with platform 120. For example, multiple users of platform 120 can each be car dealerships that have provided relationship phase data 552 and/or achievement data 554 for trusted relationships established on their behalf. A UI of application 121 can include one or more UI elements that indicate the car dealerships that have created client accounts with platform 120 and information pertaining to the relationship phase data 552 and/or achievement data 554 provided by such users.

Figure 8:
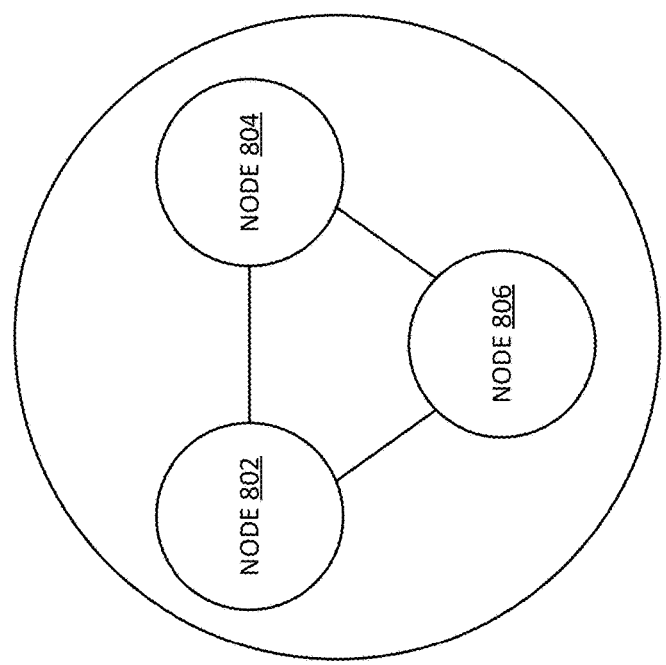
FIG. 8 illustrates an example distributed ledger network, according to aspects of the present disclosure.
Figure 8:
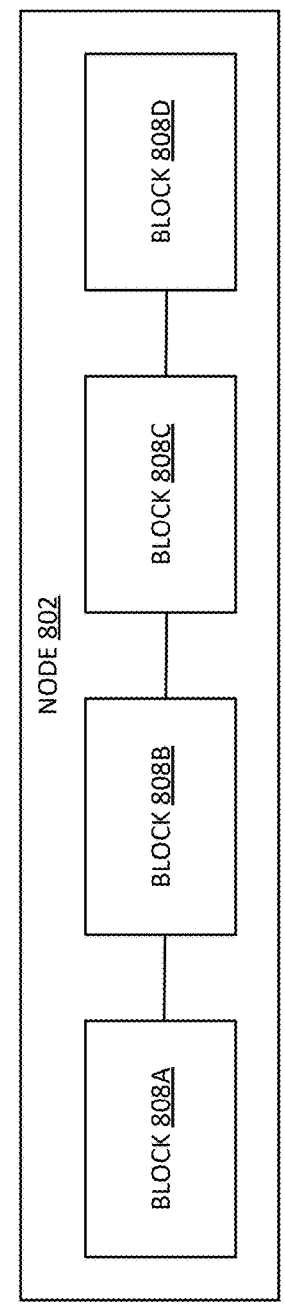

FIG. 8 illustrates an example distributed ledger network 800, according to aspects of the present disclosure. In some embodiments, distributed ledger network 800 can include one or more nodes (e.g., node 802, node 804, node 806) that maintain one or more portions of a distributed ledger. A distributed ledger 800 can be a blockchain, in some embodiments. A blockchain is a type of distributed ledger that is used, for example, in a Bitcoin crypto-currency system. The blockchain is a data structure including a complete history of each block 808 in the distributed ledger network 800 from the first block (e.g., block 808A) to the most recently added block (e.g., block 808D). Each node of the distributed ledger network 800 can maintain a copy of all or a portion of the distributed ledger in storage (e.g., on disk or in RAM) that is local to the node. For example, each node 802, 804, and/or 806 can receive a copy of the distributed ledger upon joining the network. In accordance with embodiments described herein, nodes 802, 804, and/or 806 can correspond to one or more blockchain clients. In some embodiments, distributed ledger can be a public ledger that is maintained by distinct individual computer systems each operated by different entities that maintain a single blockchain. In additional or alternative embodiments, the distributed ledger can be maintained by one or more individual computing system that are operated by a single entity (e.g., a private or a closed system).

Nodes 802, 804, and/or 806 can sequentially record data into the distributed ledger of distributed ledger network 800 as blocks of data. For example, each of nodes 802, 804, and/or 806 can be operated to "process" blocks 808 (e.g., blocks 808A, 808B, 808C, 808D) of the distributed ledger by validating data associated with each block 808. In some embodiments, only one node receives data that has been broadcasted over a network (e.g., by entity validation platform 120). Once the node receives the data, it can propagate the data to other participating nodes of the distributed ledger network 800. The other participating nodes can add the data to their copy of the distributed ledger.

Nodes 802, 804, and/or 806 can validate a new block that is added to the distributed ledger network 800 by applying an operation to data of the block. The operation can involve solving a computationally difficult problem that can be verified easily (e.g., using minimal computing resources). In some embodiments, the operation can be a hash operation. In an illustrative example, each node of distributed ledger network 800 can execute instructions (e.g., via one or more processing devices of a local computing system of the node) to attempt to compute a hash value for a respective block 808 of the node using a cryptographic hash function (e.g., a secure hash algorithm (SHA)-256 function, etc.). An input to the hash function can include data associated with the block 808, in some embodiments and an output of the hash function can include hash value that represents the data of the block 808. Nodes 802, 804, and/or 806 can build blocks 808 that include a reference (e.g., a data pointer) to the hash value of the previously block 808 of the distributed ledger. As such, blocks 808 of the distributed ledger are explicitly ordered by reference to the previous blocks' hash value, which reflects the content of that previous block. In an illustrative example, block 808B is explicitly ordered by reference to the hash value of block 808A, block 808C is explicitly ordered by reference to the hash value of block 808B, block 808D is explicitly ordered by reference to the hash value of block 808C, and so forth.

It should be noted that although embodiments of the present disclosure describe distributed ledger network 800 as a blockchain, distributed ledger network 800 can include other types of distributed ledgers, in accordance with embodiments of the present disclosure. It should be further noted that although FIG. 8 depicts three nodes (e.g., nodes 802, 804, and 806) of distributed ledger network 800, distributed ledger network 800 can include any number of nodes. In addition, although FIG. 8 depicts node 802 as including four blocks (e.g., blocks 808A, 808B, 808C, and 808D), nodes 802, 804, and/or 806 can include any number of blocks. Further, any embodiments described respect to node 802 above can be applied to any other node (e.g., node 804, 806, etc.) of distributed ledger network 800.

In some embodiments, relationship measurement component 218 can update relationship measurement data structure 258 by appending data associated with a client account and/or a trusted relationship established between client accounts to a data block (e.g., block 808) of the blockchain (e.g., distributed ledger 800) and broadcasting the data block 808 to one or more blockchain nodes 802.

Figure 9:
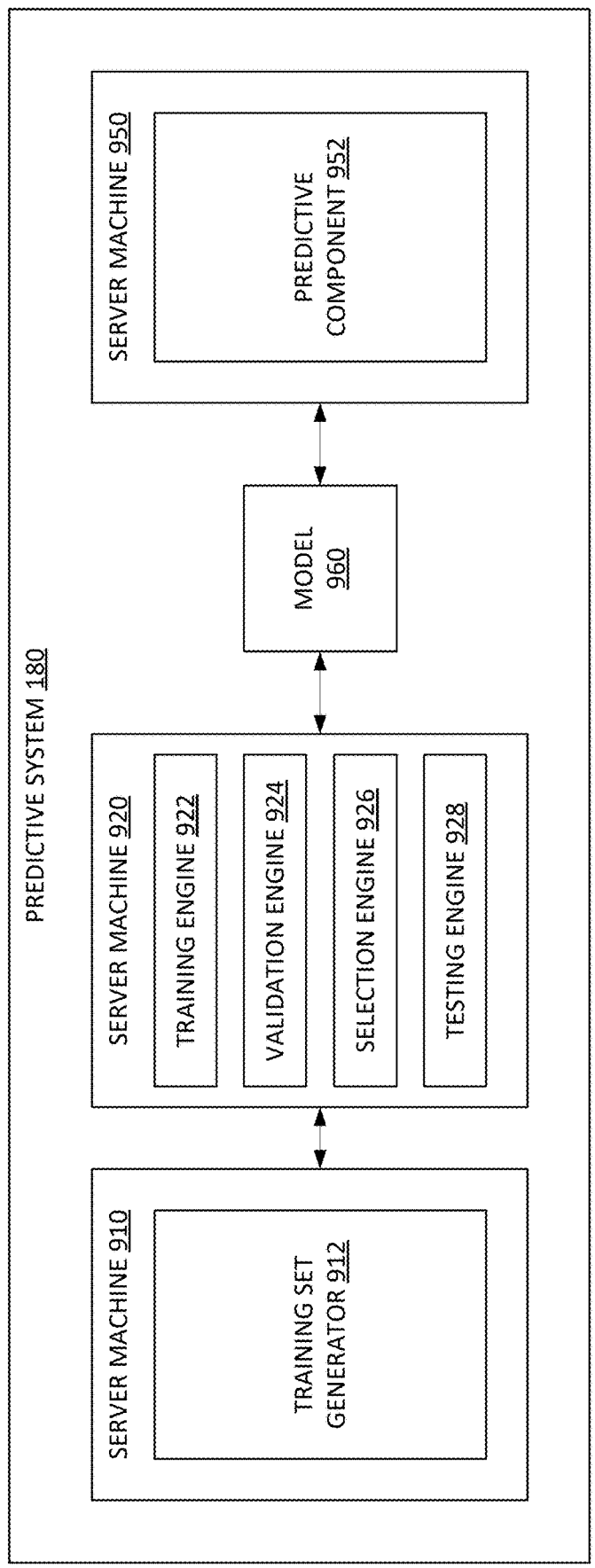
FIG. 9 illustrates an example predictive system, according to aspects of the present disclosure.

FIG. 9 illustrates an example predictive system 180, according to aspects of the present disclosure. As illustrated in FIG. 9, predictive system 180 can include a training set generator 912 (e.g., residing at server machine 910), a training engine 922, a validation engine 924, a selection engine 926, and/or a testing engine 928 (e.g., each residing at server machine 920), and/or a predictive component 952 (e.g., residing at server machine 950). In accordance with embodiments described herein, predictive component 952 can be a component of or otherwise accessible to platform 120 and/or client devices 106 of system 100. Training set generator 912 may be capable of generating training data (e.g., a set of training inputs and a set of target outputs) to train a model 960 (e.g., a sentiment analysis model, a relationship phase model, etc.).

As mentioned above, training set generator 912 can generate training data for training model 960. Training set generator 912 obtain training data for training model 960 and can organize or otherwise group the training data for training model 960 (e.g., according to the purpose of the model). In an illustrative example, training data can include characteristics associated with entity users of platform 120 and relationship phase data 552 and/or achievement data 554 provided by or otherwise associated with the entity users. Characteristics associated with entity users can include, but are not limited to, a type of the entity user, one or more products or services associated with the entity user, characteristics of patrons associated with the entity user, and so forth. In some embodiments, training set generator 912 can organize the training data into a set of training inputs (e.g., indicating the characteristics) and a set of target outputs (e.g., including the relationship phase data 552 and/or achievement data 554) and can generate an input/output mapping between each respective training input and each corresponding target output. It should be noted that training set generator 912 can generate any type of training data sufficient for training an AI model to predict relationship phase data 552 for other enterprise users of platform 120.

In another illustrative example, training data can include one or more words or phrases (e.g., provided by users of platform 120) and/or an indication of a sentiment (e.g., positive, negative, neutral) associated with the one or more words or phrases. Training set generator 912 can organize the training data into a set of training inputs (e.g., indicating the words or phrases) and a set of target outputs (e.g., indicating the sentiment of the words or phrases) and can generate an input input/output mapping between each respective training input and each corresponding target output. It should be noted that training set generator 912 can generate any type of training data sufficient for training a sentiment analysis model.

Training engine 922 can train AI model 960 using the training data (e.g., training set T) from training set generator 912. The AI model 960 can refer to the model artifact that is created by the training engine 922 using the training data that includes training inputs and/or corresponding target outputs (correct answers for respective training inputs). The training engine 922 can find patterns in the training data that map the training input to the target output (the answer to be predicted), and provide the AI model 960 that captures these patterns. The AI model 960 can be composed of, e.g., a single level of linear or non-linear operations (e.g., a support vector machine (SVM or may be a deep network, i.e., AI model that is composed of multiple levels of non-linear operations). An example of a deep network is a neural network with one or more hidden layers, and such an AI model may be trained by, for example, adjusting weights of a neural network in accordance with a backpropagation learning algorithm or the like. In one aspect, the training set is obtained by training set generator 912 hosted by server machine 910.

Validation engine 924 may be capable of validating a trained AI model 960 using a corresponding set of features of a validation set from training set generator 912. The validation engine 924 may determine an accuracy of each of the trained AI models 960 based on the corresponding sets of features of the validation set. The validation engine 924 may discard a trained AI model 960 that has an accuracy that does not meet a threshold accuracy. In some embodiments, the selection engine 926 may be capable of selecting a trained AI model 960 that has an accuracy that meets a threshold accuracy. In some embodiments, the selection engine 926 may be capable of selecting the trained AI model 960 that has the highest accuracy of the trained AI models 960.

The testing engine 928 may be capable of testing a trained AI model 960 using a corresponding set of features of a testing set from training set generator 912. For example, a first trained AI model 960 that was trained using a first set of features of the training set may be tested using the first set of features of the testing set. The testing engine 928 may determine a trained AI model 960 that has the highest accuracy of all of the trained AI models based on the testing sets.

Predictive component 952 of server machine 950 may be configured to feed data as input to model 960 and obtain one or more outputs. As described above, a predictive component 952 residing at server machine 950 can be included at or otherwise accessible to relationship establishment engine 131 and/or relationship management engine 141. Predictive component 952 can provide data as input to model 960 and obtain one or more outputs. In some embodiments, the input data can include an indication of one or more characteristics associated with an enterprise user. The one or more outputs can include relationship phase data 552 and/or achievement data 554 for the enterprise user, in view of the characteristics. In other or similar embodiments, the input data can include an indication of one or more key words or phrases of a correspondence between users of platform 120. The one or more outputs can indicate a sentiment of the key words or phrases (e.g., positive, negative, neutral, etc.).

Figure 10:
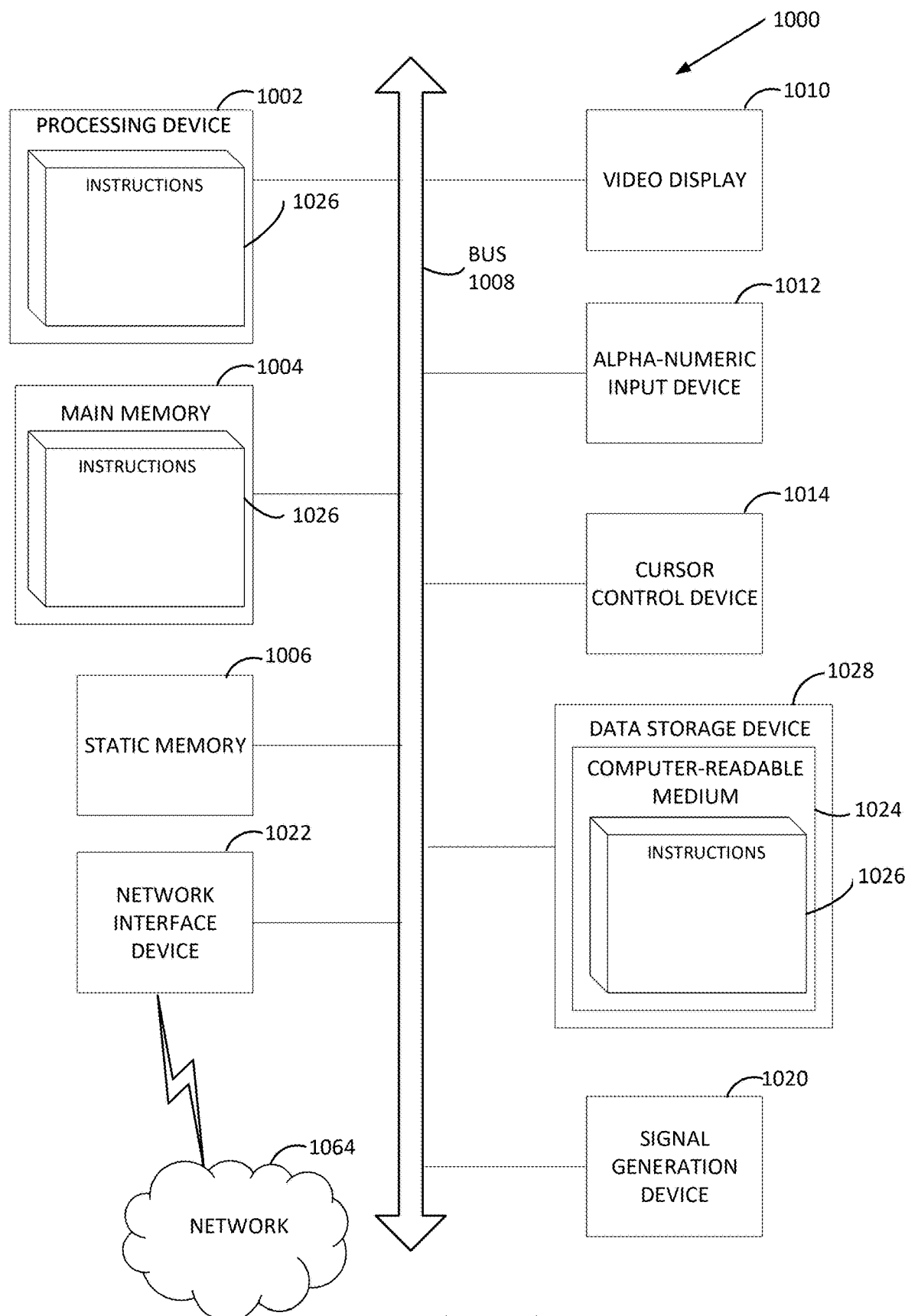
FIG. 10 is a block diagram illustrating a computer system, according to aspects of the present disclosure.

FIG. 10 is a block diagram illustrating a computer system 1000, according to certain embodiments. FIG. 10 illustrates a diagrammatic representation of a machine in the example form of a computing device 1000 within which a set of instructions, for causing the machine to perform any one or more of the methodologies discussed herein, can be executed. In alternative embodiments, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 1000 can correspond to any of client device 106, platform 120, server machine 130, server machine 140, and/or predictive system 180 of FIG. 1.

The example computing device 1000 includes a processing device 1002, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1028), which communicate with each other via a bus 1008.

Processing device 1002 can represent one or more general-purpose processors such as a microprocessor, central processing unit, or the like. More particularly, the processing device 1002 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. Processing device 1002 can also be or include a system on a chip (SoC), programmable logic controller (PLC), or other type of processing device. Processing device 1002 is configured to execute the processing logic (instructions 1026) for performing operations and steps discussed herein.

The computing device 1000 can further include a network interface device 1022 for communicating with a network 1064. The computing device 1000 also can include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1028 can include a machine-readable storage medium (or more specifically a non-transitory computer-readable storage medium) 1024 on which is stored one or more sets of instructions 1026 embodying any one or more of the methodologies or functions described herein. Wherein a non-transitory storage medium refers to a storage medium other than a carrier wave. The instructions 1026 can also reside, completely or at least partially, within the main memory 1004 and/or within the processing device 1002 during execution thereof by the computer device 1000, the main memory 1004 and the processing device 1002 constituting computer-readable storage media.

While the computer-readable storage medium 1024 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, by one or more computing devices of a software as a service (SaaS) platform, a first request associated with a first client account of a first user of the SaaS platform to establish a trusted relationship between a second client account of the SaaS platform and a third client account of the SaaS platform, wherein the establishment of the trusted relationship between the second client account and the third client account enables a second user of the second client account to engage in communication with a third user of the third client account, and wherein the second user of second client account is not permitted to engage in communication with the third user of the third client account via the SaaS platform prior to the establishment of the trusted relationship;
identifying, by the SaaS platform, a client device associated with the third client account based on information included in the first request;
transmitting, by the SaaS platform and via a messaging application that is external from the SaaS platform, a notification to the client device, wherein the notification comprises a second request to establish the trusted relationship between the second client account and the third client account and an introductory message from the first user associated with the first client account directed to the third user associated with the third client account and pertaining to initiating communication between the second user of the second client account and the third user of the third client account;

receiving, by the SaaS platform and via the messaging application, a response to the second request to establish the trusted relationship from the client device associated with the client account;

determining, by the SaaS platform, whether the received response to the second request satisfies one or more response criteria;

responsive to determining that the one or more response criteria are satisfied:
  updating, by the SaaS platform, a data structure associated with the SaaS platform by:
    updating at least a first entry of the data structure associated with the first client account to indicate the establishment of the trusted relationship facilitated by the first user of the first client account between the second client account and the third client account, and
    updating one or more second entries of the data structure associated with the second client account and the third client account to indicate that the trusted relationship is established between the second client account and the third client account; and
  performing, by the SaaS platform, a communication operation to enable communication between the client device associated with the third client account and an additional client device associated with the second client account via the messaging application, in accordance with the trusted relationship.

2. The method of claim 1, wherein the first client account is associated with a first client device, the additional client device associated with the second client account is a second client device, and the identified client device associated with the third client is a third client device, and wherein the method further comprises:
  providing a user interface (UI) to the first client device, wherein the UI comprises one or more UI elements that enable a first user of the first client device to initiate correspondence between the first client device and the third client device,
  wherein the first request is received upon detection of user engagement with the one or more UI elements.

3. The method of claim 2, wherein each of the one or more UI elements are associated with a respective form of correspondence, and wherein the method further comprises:
  detecting a first user selection of a first UI element of the one or more UI elements, wherein the first UI element is associated with a first form of correspondence;
  identifying a correspondence template associated with the first form of correspondence of the first UI element;
  updating the UI at the first client device to include content of the identified correspondence template; and
  receiving a third request from the first client device to modify at least a portion of the content of the identified correspondence template, wherein the modified portion of the content corresponds to information of the first request.

4. The method of claim 2, further comprising:
  upon performing the communication operation to enable the communication between the third client device associated with the third client account and the second client device associated with the second client account, updating the UI at the first client device to indicate that the trusted relationship is established between the second client account and the third client account.

5. The method of claim 1, wherein determining whether the one or more response criteria associated with the second request are satisfied comprises at least one of:
  determining whether a response to the second request is received during a particular time period following the transmittal of the second request to the identified client device; or
  determining whether the response indicates that a user associated with the third client account has authorized establishment of the trusted relationship between the second client account and the third client account.

6. The method of claim 1, wherein updating the data structure comprises:
  identifying the at least the first entry associated with the first client account;
  updating the first entry to include a mapping between the first client account and the second client account;
  identifying the one or more second entries associated with at least one of the second client account or the third client account; and
  updating the one or more second entries to include the mapping.

7. The method of claim 6, wherein the first entry comprises a counter indicating a number of trusted relationships established between the second client account and additional client accounts by the first client account, and wherein the method further comprises:
  incrementing a value of the counter based on the trusted relationship between the second client account and the third client account.

8. The method of claim 1, further comprising:
  determining, based on the communication between the client device associated with the third client account and the additional client device associated with the second client device comprise, whether one or more relationship criteria pertaining to the trusted relationship between the second client account and the third client account are satisfied; and
  responsive to determining that the one or more relationship criteria are satisfied, updating at least a first entry of the one or more entries of the data structure to indicate that the one or more relationship criteria are satisfied, wherein the first entry is associated with the first client account.

9. The method of claim 1, wherein the first request is received via a first application programming interface (API) call associated with the first client account.

10. The method of claim 1, further comprising:
  establishing a connection between the first client account and an additional account of another platform that is remote from the SaaS platform, wherein the connection is established based on a third request received from the first client account;
  upon performing the communication operation to enable the communication between the client device associated with the third client account and the additional client device associated with the second client account, identifying a relationship protocol provided to the SaaS platform by the second client account, wherein the relationship protocol indicates data to be transmitted from the first client account to the additional account of the other platform upon performance of the communication operation; and transmitting the data from the first client account to the additional account in accordance with the identified relationship protocol.

11. The method of claim 10, wherein the data is transmitted from the first client account to the additional client account in response to a fourth request received from the first client account.

12. A system comprising:
a memory; and
a set of one or more processors connected to the memory, wherein the set of one or more processors is to perform operations comprising:
receiving, by one or more computing devices of a software as a service (SaaS) platform, a first request associated with a first client account of a first user of the Saas platform to establish a trusted relationship between a second client account of the SaaS platform and a third client account of the SaaS platform, wherein the establishment of the trusted relationship between the second client account and the third client account enables a second user of the second client account to engage in communication with a third user of the third client account, and wherein the second user of the second client account is not permitted to engage in communication with the third user of the third client account via the SaaS platform prior to the establishment of the trusted relationship;
identifying, by the SaaS platform, a client device associated with the third client account based on information included in the first request;
transmitting, by the SaaS platform and via a messaging application that is external from the SaaS platform, a notification to the client device, wherein the notification comprises a second request to establish the trusted relationship between the second client account and the third client account and an introductory message from the first user associated with the first client account directed to the third user associated with the third client account and pertaining to initiating communication between the second user of the second client account and the third user of the third client account;
receiving, by the SaaS platform and via the messaging application, a response to the second request to establish the trusted relationship from the client device associated with the client account;
determining, by the SaaS platform, whether the received response to the second request satisfies one or more response criteria;
responsive to determining that the one or more response criteria are satisfied:
updating, by the SaaS platform, a data structure associated with the SaaS platform by:
updating at least a first entry of the data structure associated with the first client account to indicate the establishment of the trusted relationship facilitated by the first user of the first client account between the second client account and the third client account, and
updating one or more second entries of the data structure associated with the second client account and the third client account to indicate that the trusted relationship is established between the second client account and the third client account; and
performing, by the SaaS platform, a communication operation to enable communication between the client device associated with the third client account and an additional client device associated with the second client account via the messaging application, in accordance with the trusted relationship.

13. The system of claim 12, wherein the first client account is associated with a first client device, the additional client device associated with the second client account is a second client device, and the identified client device associated with the third client is a third client device, and wherein the operations further comprise:
providing a user interface (UI) to the first client device, wherein the UI comprises one or more UI elements that enable a first user of the first client device to initiate correspondence between the first client device and the third client device,
wherein the first request is received upon detection of user engagement with the one or more UI elements.

14. The system of claim 13, wherein each of the one or more UI elements are associated with a respective form of correspondence, and wherein the operations further comprise:
detecting a first user selection of a first UI element of the one or more UI elements, wherein the first UI element is associated with a first form of correspondence;
identifying a correspondence template associated with the first form of correspondence of the first UI element;
updating the UI at the first client device to include content of the identified correspondence template; and
receiving a third request from the first client device to modify at least a portion of the content of the identified correspondence template, wherein the modified portion of the content corresponds to information of the first request.

15. The system of claim 13, wherein the operations further comprise: upon performing the communication operation to enable the communication
between the third client device associated with the third client account and the second client device associated with the second client account, updating the UI at the first client device to indicate that the trusted relationship is established between the second client account and the third client account.

16. The system of claim 12, wherein determining whether the one or more response criteria associated with the second request are satisfied comprises at least one of:
determining whether a response to the second request is received during a particular time period following the transmittal of the second request to the identified client device; or
determining whether the response indicates that a user associated with the third client account has authorized establishment of the trusted relationship between the second client account and the third client account.

17. The system of claim 12, wherein updating the data structure comprises:
identifying the at least the first entry associated with the first client account;
updating the first entry to include a mapping between the first client account and the second client account;
identifying the one or more second entries associated with at least one of the second client account or the third client account; and
updating the one or more second entries to include the mapping.

18. A non-transitory computer-readable medium comprising instructions that, when executed by a processing device, cause the processing device to perform operations comprising:

receiving, by one or more computing devices of a software as a service (Saas) platform, a first request associated with a first client account of a first user of the Saas platform to establish a trusted relationship between a second client account of the SaaS platform and a third client account of the SaaS platform, wherein the establishment of the trusted relationship between the second client account and the third client account enables a second user of the second client account to engage in communication with a third user of the third client account, and wherein the second user of second client account is not permitted to engage in communication with the third user of the third client account via the SaaS platform prior to the establishment of the trusted relationship;

identifying, by the SaaS platform, a client device associated with the third client account based on information included in the first request;

transmitting, by the SaaS platform and via a messaging application that is external from the SaaS platform, a notification to the client device, wherein the notification comprises a second request to establish the trusted relationship between the second client account and the third client account and an introductory message from the first user associated with the first client account directed to the third user associated with the third client account and pertaining to initiating communication between the second user of the second client account and the third user of the third client account;

receiving, by the SaaS platform and via the messaging application, a response to the second request to establish the trusted relationship from the client device associated with the client account;

determining, by the SaaS platform, whether the received response to the second request satisfies one or more response criteria satisfied;

responsive to determining that the one or more response criteria are satisfied;

updating, by the SaaS platform, a data structure associated with the SaaS platform by:
updating at least a first entry of the data structure associated with the first client account to indicate the establishment of the trusted relationship facilitated by the first user of the first client account between the second client account and the third client account, and
updating one or more second entries of the data structure associated with the second client account and the third client account to indicate that the trusted relationship is established between the second client account and the third client account; and performing, by the SaaS platform, a communication operation to enable communication between the client device associated with the third client account and an additional client device associated with the second client account via the messaging application, in accordance with the trusted relationship.

19. The method of claim 1, further comprising:

responsive to determining that the one or more response criteria are not satisfied, updating, by the SaaS platform, the data structure by updating the at least the first entry of the data structure associated with the first client account to indicate a violation of a communication policy with respect to the third client account.

20. The method of claim 19, further comprising:

receiving an additional request associated with the first client account to establish another trusted relationship between a fourth client account of the SaaS platform and a fifth client account of the SaaS platform;

determining that the first client account is associated with a probation status in view of the violation of the communication policy indicated by the at least the first entry of the data structure; and providing a notification to a first client device associated with the first client account indicating that the additional request to establish the other trusted relationship between the fourth client account and the fifth client account in view of the probation status.

* * * * *